(12) United States Patent
Chapman et al.

(10) Patent No.: US 12,094,072 B2
(45) Date of Patent: Sep. 17, 2024

(54) THREE DIMENSIONAL DIORAMA FOR SPATIAL COMPUTING ASSETS

(71) Applicant: MAGIC LEAP, INC., Plantation, FL (US)

(72) Inventors: Brennan Lee Chapman, Miami, FL (US); Michel Ian Marrache, North Miami Beach, FL (US); Richard Silliker, Plantation, FL (US); Carlos Roque, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/202,124

(22) Filed: Mar. 15, 2021

(65) Prior Publication Data

US 2021/0287453 A1    Sep. 16, 2021

Related U.S. Application Data

(60) Provisional application No. 62/989,358, filed on Mar. 13, 2020.

(51) Int. Cl.
*G06T 9/20* (2006.01)
*G06F 3/04815* (2022.01)
(Continued)

(52) U.S. Cl.
CPC .......... *G06T 19/20* (2013.01); *G06F 3/04815* (2013.01); *G06T 15/20* (2013.01);
(Continued)

(58) Field of Classification Search
CPC ....... G06T 19/20; G06T 19/006; G06T 15/20; G06T 2219/2016; H04N 13/279; G06F 3/04815
See application file for complete search history.

(56) References Cited

U.S. PATENT DOCUMENTS 5,694,531 A  * 12/1997  Golin ...................... G06T 15/20
                                                         345/419
10,203,762 B2 *  2/2019  Bradski ................ H04N 21/414
(Continued)

OTHER PUBLICATIONS

Schmalstieg, D, et al., "The Studierstube Augmented Reality Project," Presence, vol. I I, No. I, Feb. 2002, 33-54.
(Continued)

*Primary Examiner* — Motilewa Good-Johnson
(74) *Attorney, Agent, or Firm* — Vista IP Law Group, LLP

(57) ABSTRACT

Controllable three-dimensional (3D) virtual dioramas in a rendered 3D environment such as a virtual reality or augmented reality environment including one or more rendered objects. 3D diorama is associated with a spatial computing content item such as a downloadable application executable by a computing device. 3D diorama assets may include visual and/or audio content and are presented with rendered 3D environment objects in a composite view, which is presented to a user through a display of computing device. 3D diorama is rotatable in composite view, and at least one 3D diorama asset at least partially occludes, or is at least partially occluded by, at least one rendered 3D environment object. 3D diorama may depict or provide a preview of a spatial computing user experience generated by the downloadable application.

28 Claims, 14 Drawing Sheets

(51) Int. Cl.
*G06T 15/20* (2011.01)
*G06T 19/00* (2011.01)
*G06T 19/20* (2011.01)
*H04N 13/279* (2018.01)

(52) U.S. Cl.
CPC ......... *G06T 19/006* (2013.01); *H04N 13/279* (2018.05); *G06T 2219/2016* (2013.01)

(56) References Cited

U.S. PATENT DOCUMENTS

| | | | | |
|---|---|---|---|---|
| 10,217,185 | B1* | 2/2019 | Cabanero | H04L 67/01 |
| 10,373,392 | B2* | 8/2019 | Christen | G06T 19/20 |
| 10,460,497 | B1* | 10/2019 | Steinbach | G06T 19/003 |
| 10,672,191 | B1* | 6/2020 | Besecker | G06T 19/006 |
| 10,852,838 | B2* | 12/2020 | Bradski | H04N 13/189 |
| 11,093,102 | B2* | 8/2021 | Roskind | H04W 64/00 |
| 11,093,103 | B2* | 8/2021 | Agarawala | G06T 19/20 |
| 11,288,875 | B2* | 3/2022 | Khalid | G06T 17/20 |
| 2010/0333037 | A1* | 12/2010 | Pavlovski | G06F 3/0481 |
| | | | | 715/848 |
| 2011/0039041 | A1* | 2/2011 | Williams | B44F 7/00 |
| | | | | 493/405 |
| 2014/0025529 | A1* | 1/2014 | Honeycutt | G06Q 30/0621 |
| | | | | 705/26.5 |
| 2014/0228118 | A1* | 8/2014 | Hardy | A63F 13/655 |
| | | | | 463/31 |
| 2016/0026253 | A1* | 1/2016 | Bradski | H04N 13/128 |
| | | | | 345/8 |
| 2017/0287218 | A1 | 10/2017 | Nuernberger et al. | |
| 2018/0046363 | A1* | 2/2018 | Miller | G06F 3/012 |
| 2018/0114372 | A1* | 4/2018 | Nagy | G06T 19/006 |
| 2018/0144547 | A1* | 5/2018 | Shakib | G06T 15/503 |
| 2018/0239144 | A1* | 8/2018 | Woods | A63F 13/213 |
| 2019/0005724 | A1* | 1/2019 | Pahud | G06T 7/70 |
| 2019/0051052 | A1* | 2/2019 | Corazza | G06T 15/506 |
| 2019/0295330 | A1* | 9/2019 | Nagy | G06T 19/20 |
| 2020/0326831 | A1* | 10/2020 | Marr | G06F 3/04815 |
| 2021/0142573 | A1* | 5/2021 | Tsuda | G06T 19/006 |
| 2021/0287453 | A1* | 9/2021 | Chapman | G06F 3/04817 |
| 2021/0311608 | A1* | 10/2021 | Sommer | G06F 3/167 |
| 2022/0134544 | A1* | 5/2022 | Weisswange | B25J 9/1664 |
| | | | | 700/250 |

OTHER PUBLICATIONS

Wade, J. et al., "A Gaze-Contingent Adaptive Virtual Reality Driving Environment for Intervention in Individuals with Autism Spectrum Disorders," ACM Transactions on Interactive Intelligent Systems, vol. 6, No. 1, Article 3, Publication date: Mar. 2016.

* cited by examiner

THREE DIMENSIONAL DIORAMA FOR SPATIAL COMPUTING ASSETS

CROSS-REFERENCE TO RELATED APPLICATION

This application claims priority under 35 U.S.C. § 119 of U.S. Provisional Application No. 62/989,358, filed Mar. 13, 2020, and entitled THREE DIMENSIONAL DIORAMA FOR SPATIAL COMPUTING ASSETS, the contents of which are incorporated herein by reference as though set forth in full.

TECHNICAL FIELD

The technical field relates to computer-generated three-dimensional (3D) environments.

BACKGROUND

Modern computing and display technologies have facilitated the development of systems for virtual reality (VR), augmented reality (AR) and mixed reality (MR) experiences, in which digitally reproduced, virtual objects are presented to a user in a display device such that the user can perceive the virtual objects as if they were real objects. A VR scenario typically involves presentation of virtual objects within a virtual environment without also presenting the actual real-world environment. An AR or MR scenario typically involves presentation of virtual objects in addition to (e.g., as an augmentation to) visualization of the actual world proximal to the user. In some instances, the virtual objects can be presented as if they were actually present in the real world.

An AR or MR environment can also be described as a spatial computing environment, in which virtual objects are rendered in a manner that is cognizant of, or in some way depends on, the presence and characteristics of objects in the physical world. For example, a virtual character can be presented as walking on a physical object (e.g., a table) in the user's physical environment.

Developers, artists, user experience designers, and others may develop spatial computing assets or experiences, such as applications for communications, co-presence, conferencing, entertainment, gaming, education, health care, industrial design, command and control, and other purposes, and such assets or experiences can be created for user viewing and interaction within a spatial computing environment provided by a spatial computing system. Given the particular 3D nature of a spatial computing environment, as distinct from a traditional two-dimensional (2D) application shown on a traditional computing device with a 2D user interface, previously available solutions are inadequate for conveying to potential users the nature of a spatial computing asset or experience.

SUMMARY

Embodiments of the present disclosure are generally related to techniques for presenting spatial computing assets of a computer-generated 3D diorama within a computer generated 3D environment such as an AR, VR or MR environment.

Certain embodiments involve integration of 3D diorama structures into rendered 3D environments. Certain embodiments involve 3D diorama movements within rendered 3D environments and how 3D diorama movements impact a resulting scene presented to a user. Certain embodiments involve occlusion within a rendered 3D environment, including occlusion of an object of the rendered 3D environment by a 3D diorama asset and/or occlusion of a 3D diorama asset by an object of the rendered 3D environment, and scene modifications based on occlusion.

Embodiments also involve a combination of one or more of 3D diorama structures, movements and occlusion adjustments within a rendered 3D environment. For example, certain embodiments involve how 3D diorama assets and rendered 3D environment objects are displayed when a 3D diorama asset partially or completely occludes a 3D environment object, or when a 3D environment object partially or completely occludes a 3D diorama asset and how rotation or movement of a 3D diorama within the rendered 3D environment changes said occlusions.

Certain embodiments involve modifying how a 3D diorama or a rendered 3D environment object is displayed to account for occlusion of at least a portion of the 3D diorama by the object or occlusion of at least a portion of the object by the 3D diorama. Certain embodiments involve such modifications based on rotational movement of the 3D diorama.

Certain embodiments also involve how a 3D diorama for a spatial computing content item such as a downloadable application depicts or provides a preview of the user experience provided by the application. The user, after viewing this preview, may then decide that the application is of interest and download the application to a computing device. Certain embodiments involve viewing the 3D diorama through a head worn computing device to which the application may be downloaded.

Certain embodiments also involve how 3D diorama assets move into and out of occlusion relative to objects of a rendered 3D environment and associated visual adjustments in order to provide verisimilitude in the rendered 3D environment.

Certain embodiments also involve how a 3D diorama is presented and how a scene of a composite view including a 3D diorama assets and rendered 3D environment objects is modified. Certain embodiments involve scene or 3D diorama rotation-based modification, which may involve no occlusion, partial occlusion, or complete occlusion before and/or after rotation. For example, in an initial rotational position, a 3D diorama asset may not be occluded by a particular object of a rendered 3D environment, but as the 3D diorama is rotated, the object may increasingly occlude the asset, which may result in a maximum partial occlusion or complete occlusion. Further, with continued 3D diorama rotation, the occlusion of the 3D diorama asset by the object may decrease or be eliminated such that the rendered 3D environment object no longer occludes the 3D diorama asset. Thus, the degree of rotation may impact the degree of occlusion of a rendered One embodiment is for a computer-implemented method for presenting a 3D diorama in a computer-generated environment that is presented to a user of a computing device. The method may be executed by a spatial computing device, such as a head worn VR or AR display. The method comprises determining a rendered 3D environment in which to present the 3D diorama. The rendered 3D environment includes at least one object. The 3D diorama is associated with a spatial computing content item executable by the computing device and includes at least one asset. The method further comprises accessing assets of the 3D diorama. The method further comprises compositing 3D diorama assets with rendered 3D environment to generate a composite view in which the 3D diorama is rotatable and at least one 3D diorama asset at least partially occludes, or is at least partially occluded by, at least one rendered 3D environment object. The composite view is presented to the user through a display of the computing device and presented through a portal that is accessible or executed by the computing device such as a head worn spatial computing device through which a user may access the portal and composite view.

In a single or multiple embodiments, the method further comprises moving, e.g., rotating, the 3D diorama in the composite view. For example, a 3D diorama asset in a first rotational position may occlude, or be occluded by, a first portion of an object of the rendered 3D environment, and the 3D diorama asset in a second rotational position occludes, or is occluded by, a second portion of the object that is different from the first portion of the object. A 3D diorama asset may at least partially occlude a rendered 3D environment object, a rendered 3D environment object may at least partially occlude a 3D diorama asset, and the degree of occlusion may change as the 3D diorama is moved or rotated. Thus, in one embodiment, a 3D diorama asset in a first rotational position at least partially occludes, or is at least partially occluded by, a first object of the rendered 3D environment, and that asset in a second rotational position may not occlude, and is not occluded by, the first object. In another embodiment, the 3D diorama asset in the second rotational position at least partially occludes, or is at least partially occluded by, a second object of the rendered 3D environment different from the first object. An object of the rendered 3D environment may be at least partially occluded by one or multiple 3D diorama assets, and a 3D diorama asset may be at least partially occluded by one or multiple rendered 3D environment objects. The degree of occlusion (whether not occluded, partial occluded or completely occluded) can vary as the scene changes, e.g., as the 3D diorama is rotated to provide different points of view or perspectives. This movement or rotation may be controlled by the user, e.g., in response to user input received through a mouse, a keyboard, a touchpad, or a touchscreen of the computing device such as a smartphone, a touchscreen laptop computer, a wearable computer or a spatial computing device.

In a single or multiple embodiments, the 3D diorama is rotatable to simulate movement of a viewpoint around the 3D diorama and a camera is panning around the 3D diorama. Rotation may be controlled or initiated by a user of computing device or automatic according to a pre-determined or programmed animation sequence. The 3D diorama may include visual assets for display to the user and may also include audio content.

In a single or multiple embodiments, an asset of the 3D diorama moves into and out of occlusion as the 3D diorama is rotated to provide verisimilitude in the rendered 3D environment.

In a single or multiple embodiments, the 3D diorama depicts or provides a preview of a spatial computing user experience generated by the spatial computing content item such as an application that can be purchased (if necessary) and downloaded from a portal or from a page of the portal, or from a portal "app store" to the user's computing device. Portal may be accessible through a computing device such as a head worn spatial computing device or other computing device noted above. The portal may be an on-line portal that is presented to the user through a web browser executed by the computing device. For example, a portal may include computer-generated icons identifying respective spatial computing content items such as downloadable applications. Respective 3D dioramas are associated with respective applications, and respective 3D dioramas provide respective previews of respective application user experiences.

In a single or multiple embodiments, the user provides input through an input device of the computing device to select an icon for an application, and in response, a detail page associated with the selected computer-generated icon is displayed. The detail page includes information about the application and controls or UI elements that can be selected by the user to download the application to the user's computing device. In one embodiment, the 3D diorama is displayed within or accessible through the detail page.

In a single or multiple embodiments, assets of the 3D diorama are anchored in a virtual physical space of the rendered 3D environment. The 3D diorama may be presented within a 3D structure that defines a 3D bounding volume contained within the rendered 3D environment. In other words, the 3D diorama occupies a subset of the rendered 3D environment. The bounding structure may or may not be visible to the user.

In a single or multiple embodiments, the 3D structure is a 3D bounding box or cube that includes opposing planes or sides that collectively define the 3D bounding volume. The 3D structure may be in the form of a 3D bounding box, but other volumetric shapes may also be utilized such as cylindrical and spherical bounding structure shapes.

In certain embodiments involving a 3D bounding box, at least one plane of the 3D bounding box may be adjacent to a horizontal or vertical surface of an object of the rendered 3D environment. For example, a plane of the 3D bounding box includes a virtual bottom that is depicted as being placed on a horizontal surface of the object of the rendered 3D environment so that the virtual bottom of the 3D bounding box appears to rest on the horizontal surface of the object. In certain embodiments, the virtual bottom of the 3D diorama may be able to be positioned on one horizontal surface but not another, e.g., on the floor of the rendered 3D environment, but not on top of a table of the rendered 3D environment. Thus, certain portions of the 3D bounding box such as the virtual bottom of the 3D bounding box may be precluded from being depicted as being placed on certain horizontal surfaces of the rendered 3D environment. A side or plane of the 3D bounding box may also be portrayed as being placed against a vertical surface of the object of the rendered 3D environment.

In a single or multiple embodiments, assets of the 3D diorama are independently controllable relative to objects of the rendered 3D environment and can be controlled by a user of the computing device.

In a single or multiple embodiments, 3D diorama assets can interact with or react to each other.

Further embodiments are for computing systems of, or for use with, rendered 3D environments such as VR, AR and MR environments. System embodiments may include software and/or hardware components configured or operable to present a 3D diorama in a computer-generated 3D environment. System embodiments may include or involve a user's computing device, which includes a memory, program instructions, a processor or controller to execute instructions, a display and a user input device, and a 3D diorama processor or diorama integrator configured or operable to determine a rendered 3D environment in which to present the 3D diorama, access assets of the 3D diorama and generate a composite view of 3D diorama assets and rendered 3D environment objects that is presented to the user through the display, e.g., through a portal accessed via a head worn spatial computing device.

The 3D diorama is rotatable and at least one asset of the 3D diorama at least partially occludes, or is at least partially occluded by, at least one object of the rendered 3D environment. System embodiments may include one or more or all of the 3D environment objects and 3D diorama assets.

Other embodiments are for a non-transitory computer readable medium tangibly embodying one or more sequences of instructions that are executed to perform computer-implemented method embodiments.

Further embodiments are for user interface structures and dynamic UI modifications, including rotation-based UI modifications that account for 3D diorama and/or rendered 3D environment object occlusion.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

Details of one or more embodiments of the present disclosure are set forth in the accompanying drawings and the description below. Other features and advantages of the present disclosure will be apparent from the description and drawings, and from the claims.

DETAILED DESCRIPTION OF ILLUSTRATED EMBODIMENTS

Figure 1:
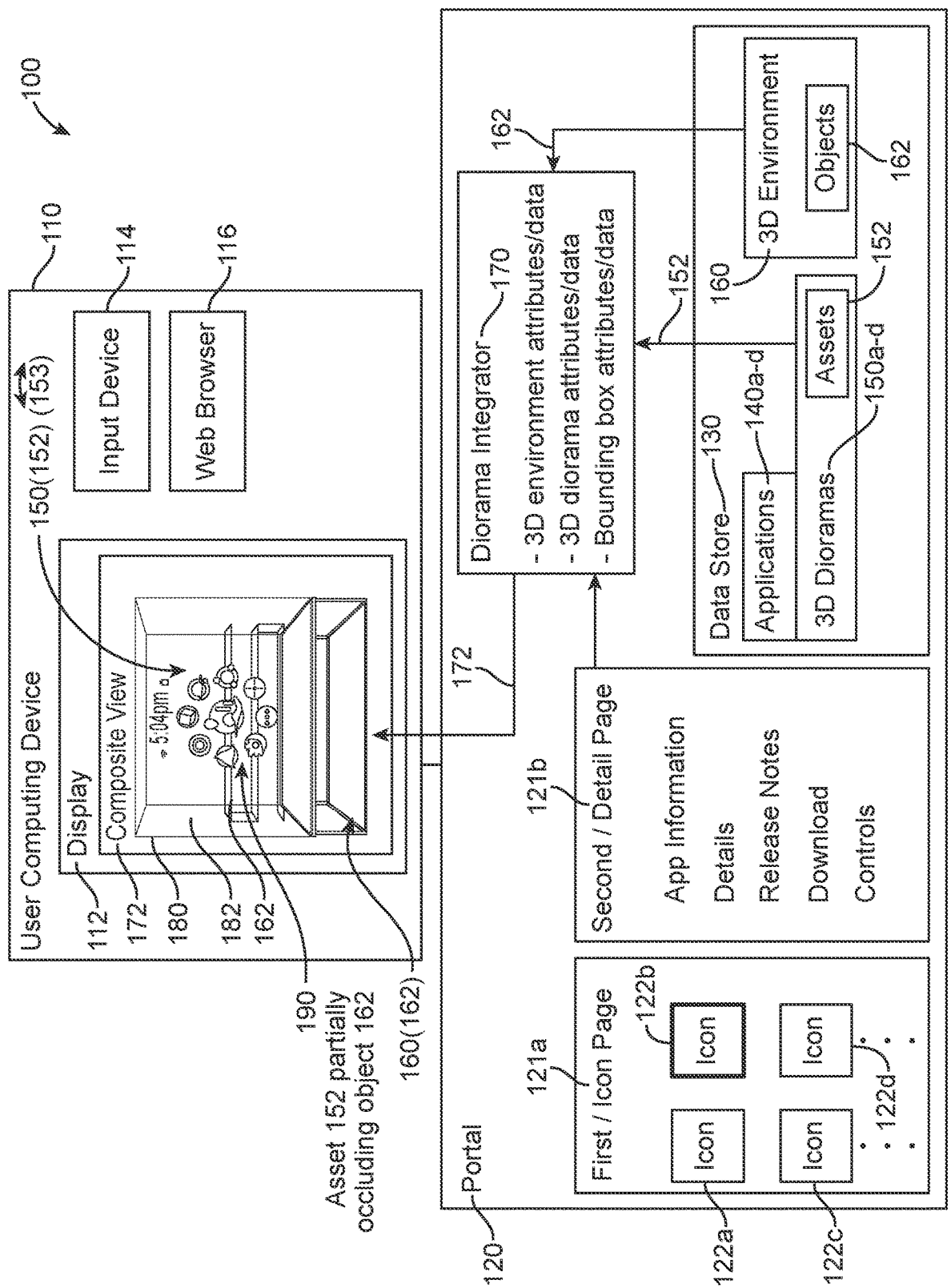
FIG. 1 depicts one embodiment of a spatial computing system for generating a 3D composite view integrating assets of a 3D diorama into a computer-generated 3D environment and how the resulting composite view reflects asset-object occlusions.

Embodiments are for computer-implemented methods, computing systems such as spatial computing systems, computer-readable media and/or interactive user interface structures for providing a separately controllable 3D diorama within a computer-generated or rendered 3D environment.

Embodiments provide for adjustment or modification of a resulting 3D composite view or scene based on the spatial relationships of 3D diorama assets and rendered 3D environment objects. For example, depending on the point of view or rotational position, an asset of the 3D diorama may block or occlude an object of the rendered 3D environment, while at a different point of view or rotational position, that same rendered 3D environment object may block or occlude the asset of the 3D diorama, or a previously occluded asset or object may not be occluded in a subsequent rotational position. Such visualization and occlusion adaptation is reflected in a realistic composite scene of the 3D diorama that is contained within the larger rendered 3D environment and that reflects the selected chosen point of view, e.g., as the user manipulates the 3D diorama to rotate or move the 3D diorama or in accordance with an animation sequence. In this manner, embodiments provide verisimilitude in the resulting rendered spatial environment, or in other words, a truer or more accurate depiction of how the 3D diorama assets and rendered 3D environment appear together including when one may occlude the other and occlusion changes resulting from rotation. Such occlusion also contributes to a preview of the spatial computing experience that the user may enjoy if they download the application to their computing device since the interaction of virtual and real-world objects may be an aspect of the spatial user experience.

One example of how embodiments may be utilized is to depict or provide a preview of a spatial computing user experience that would be generated by a spatial computing content item such as an application that can be downloaded from a portal or "app store" to a user's computing device, such as a head worn AR or VR spatial computing device including or through which a portal can be accessed. In these embodiments, each application is associated with its own 3D diorama. A browser may be executed by the user's computing device to access a portal page that can be accessed or viewed by the user. Portal page includes icons for respective applications that are available for download. In certain embodiments involving a head worn AR or VR display, the portal icons serve as "windows" or "picture frames" through which a user may look to view the 3D diorama in a rendered 3D environment and see a preview of the digital user experience provided by that application. Examples of such head worn spatial computing devices are available from Magic Leap, Inc.

Thus, a user may select and view, or direct their gaze toward, an icon with a mouse, touchscreen or other input device or command, and in response, additional information or a separate page with additional information about the application is provided. The 3D diorama for that application may be presented within a rendered 3D environment in order to provide a preview of the user experience provided by that application, which may be downloaded to the user's computing device if the user so chooses.

Referring to FIG. 1, in one embodiment in which 3D dioramas are associated with downloadable applications from an "app store" and integrated into a rendered 3D environment, a computing system 100 such as a spatial computing system includes a computing device 110 that includes, is in communication with, or has access to, a portal 120. While computing device 110 and portal 120 are shown as separate components in communication with each other in FIG. 1, it will be understood that computing device 110 may include portal 120, be in communication with portal 120, or that portal 120 is viewable while using or wearing user computer device, such as an AR or VR head mounted display available from Magic Leap, Inc. For ease of explanation, reference is made to computing device 110 and portal 120. Further, while various components of computing device 110 are omitted for ease of explanation and illustration, components of exemplary computing devices 110 are described with reference to FIG. 14 and in published U.S. applications and patents incorporated by reference herein.

Computing device 110, such as a smartphone, touchscreen laptop computer, wearable computing device or spatial computing device such as a head worn spatial computing or VR/AR device (generally, computing device 110) includes a display 112 and one or more input devices 114. Input devices 114 may include or involve one or more of a mouse, a keyboard, a touchpad, a touchscreen, a visual input device, an eye tracking device, or other input device 114 (generally, input device 114). Computing device 110 may execute a web browser 116 such as GOOGLE CHROME web browser and INTERNET EXPLORER web browser for portal 120, which may be a web portal and accessible via a network. Portal 120 may include pages that are presented in web browser 116. Portal 120 includes or is in communication with a data store or database 130 (generally, data store 130) including various spatial computing content items 140, such as applications or "apps" (generally, application 140). Portal 120 serves as an "app store" that provides previews of application 140 user experiences and that allows for downloading of applications 140 from data store 130 of portal 120 to computing device 110.

Figure 2:
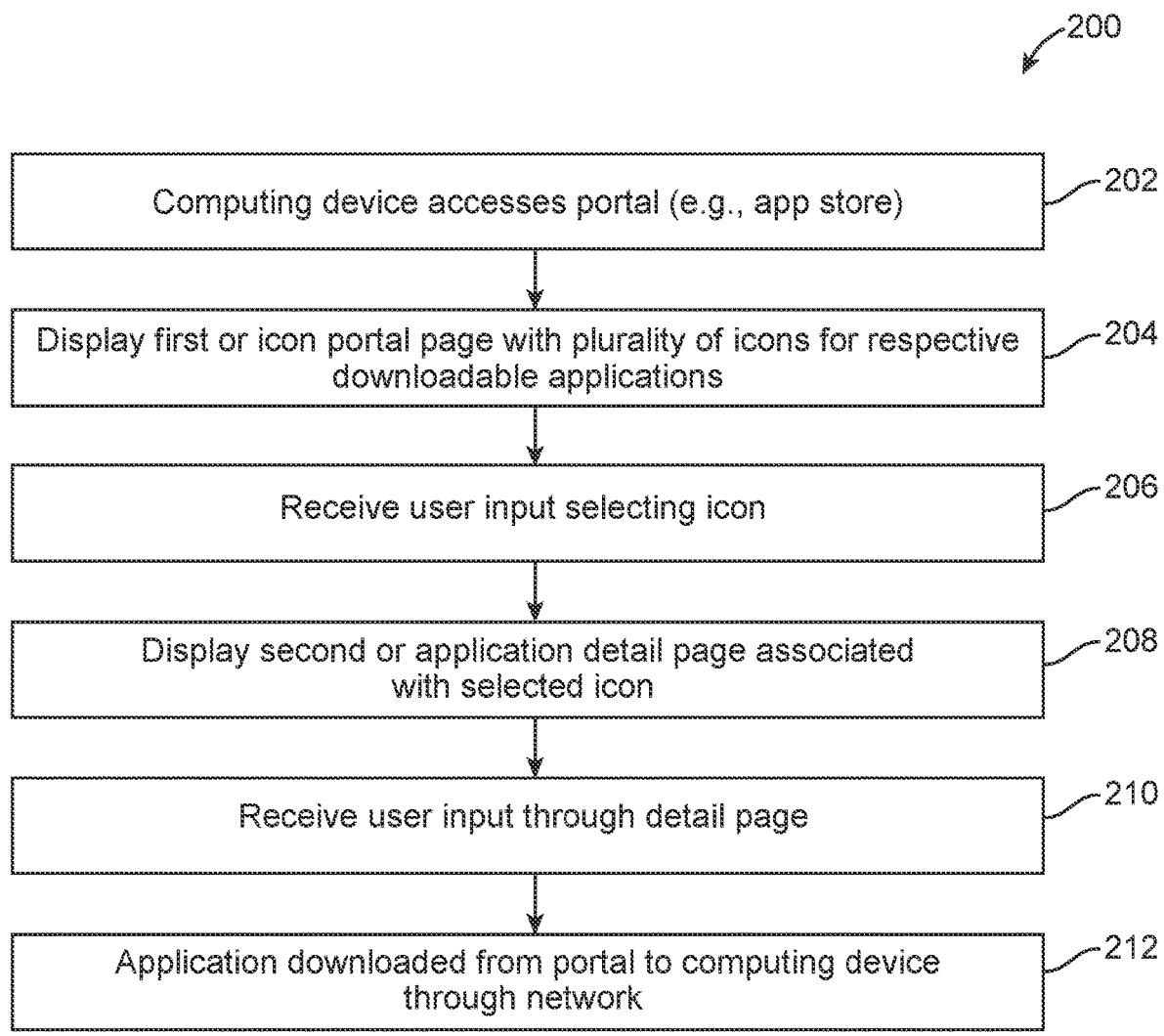
FIG. 2 is a flow diagram of one embodiment for downloading a spatial computing content item such as an application through a portal, wherein a preview of a digital user experience provided by the application is provided by composite view of 3D diorama assets and computer-generated 3D environment.

Referring to FIG. 2, and with continuing reference to FIG. 1, in a computer-implemented method 200 according to one embodiment, at 202, portal 120 includes one or more pages that can be accessed, e.g., by web browser 116 and network as necessary, to allow a user to navigate to, preview, and download application 140 to computing device 110. In the illustrated embodiment, at 204, user is initially directed to a first portal page 121a or an "icon page" (generally, first portal page 121a). First portal page 121a includes a plurality of icons 122. FIG. 1 depicts four icons 122a-d and user selection of icon 122b for application 140b of applications 140a-d. Application 140b is associated with 3D diorama 150b of 3D diorama 150a-d and corresponding assets 152 thereof.

Figure 5:
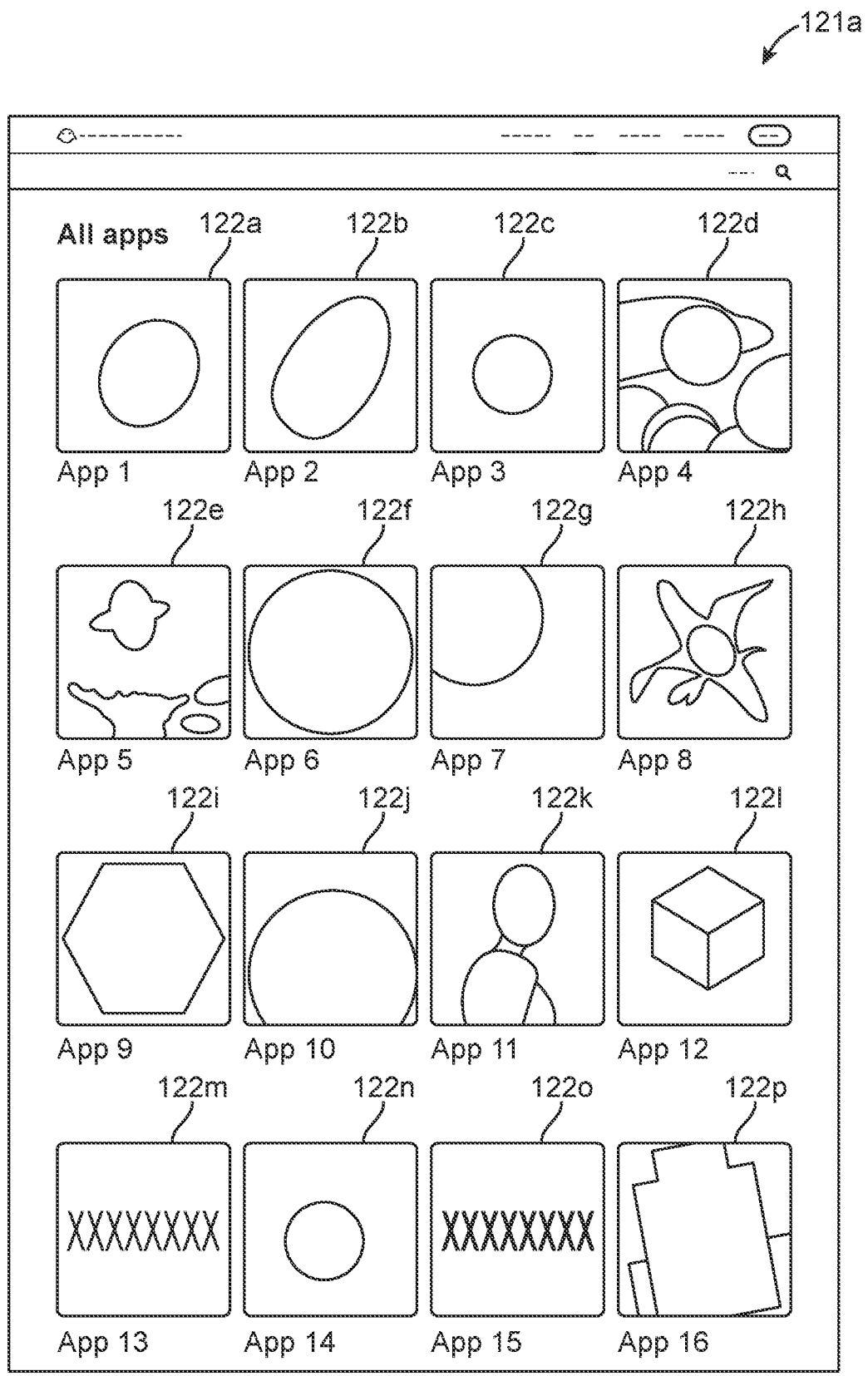
FIG. 5 depicts a first or icon page of a portal that includes respective icons identifying respective spatial computing content items such as downloadable applications.

FIG. 5 illustrates an example of first portal page 121a in further detail as including 16 icons 122a-p (generally, icon 122) identifying 16 different applications 140a-p (generally, application 140). Applications 140 are stored in data store 130 and hosted by or accessed by portal 120. It will be understood that first portal page 121a may include different number of icons 122 for different numbers of applications 140, and that portal 120 may store or provide access to tens, hundreds, or thousands of applications 140. Accordingly, FIGS. 1 and 5 are provided for purposes of illustration and explanation.

According to certain embodiments, with certain computing devices 110, such as a head worn spatial computing device available from Magic Leap, Inc., icons 122 of portal 120 serve as "windows" or "picture frames" into which a user may look into or glance at while wearing spatial computing device to view a preview of a digital user experience provided by an application 140. Further details regarding computing device 110 in the form of a head mounted spatial computing device and portals 120 are described in U.S. Patent Application Publication No. US2019/0199993A1, entitled "Methods and System for Generating and Displaying 3D Videos in Virtual, Augmented, or Mixed Reality Environment," U.S. Patent Application Publication No. US2013/0050258 A1, entitled "Portals: Registered Objects as Virtualized, Personalized Displays" and U.S. Pat. No. 10,282,907, entitled "Interacting With a Network to Transmit Virtual Image Data in Augmented or Virtual Reality Systems," the contents of both of which are incorporated herein by reference as though set forth in full. For ease of explanation and not limitation, reference is made generally to computing device 110, portal 120 and icons 122 thereof.

At 206, during user navigation of first portal page 121a, icon 122, such as icon 122b identifying Application 140b, is selected by user via input device 114. In response, user is directed to a second or "detail" portal page 121b (generally, second portal page 121b) at 208. Second portal page 121b includes additional information about application 140b associated with selected icon 122b. Second portal page 121b may include UI element, button or other control element to allow user to download Application 2 140b to computing device 110 at 210.

With continuing reference to FIG. 1, data store 130 includes applications 140 and associated 3D dioramas 150 including visual and/or audio assets 152 (generally, asset 152 or 3D diorama asset 152). For example, asset 152 of 3D diorama 150 may include an animation including programmed visual and/or audio content, e.g., an asset 152 may make noises, or be presented along with music, ambient sounds, or other suitable audio content.

Portal 120 hosts or has access to one or more associated rendered 3D environments 160 including rendered objects 162. Rendered 3D environment 160 may be selected or created by a source or creator of 3D diorama 150 or associated with application 140 based at least partly on a domain of application 140. For example, a rendered 3D environment 160 of a classroom setting may be used for an education application, whereas a rendered 3D environment 160 of an industrial setting may be used for an industrial design/control/management application, and a rendered 3D environment 160 of a health care environment or hospital room or map for a health-related application, and so on. Data store 130 of or accessed by online portal 120 includes applications 140, respective 3D dioramas 150 associated with respective applications 140, and one or more rendered 3D environments 160 related to an application 140 and associated 3D diorama 150.

With continuing reference to FIG. 1, portal 120 also includes or accesses diorama integrator 170. Diorama integrator 170 receives data of assets 152 of 3D diorama 150 associated with a selected application 140, data of objects 162 of rendered 3D environment 160. Diorama integrator 170 composites or merges 3D diorama assets 152 and rendered 3D environment objects 162 based on data thereof to generate a composite view 172 of the 3D diorama 150 and rendered 3D environment 160.

Figure 3:
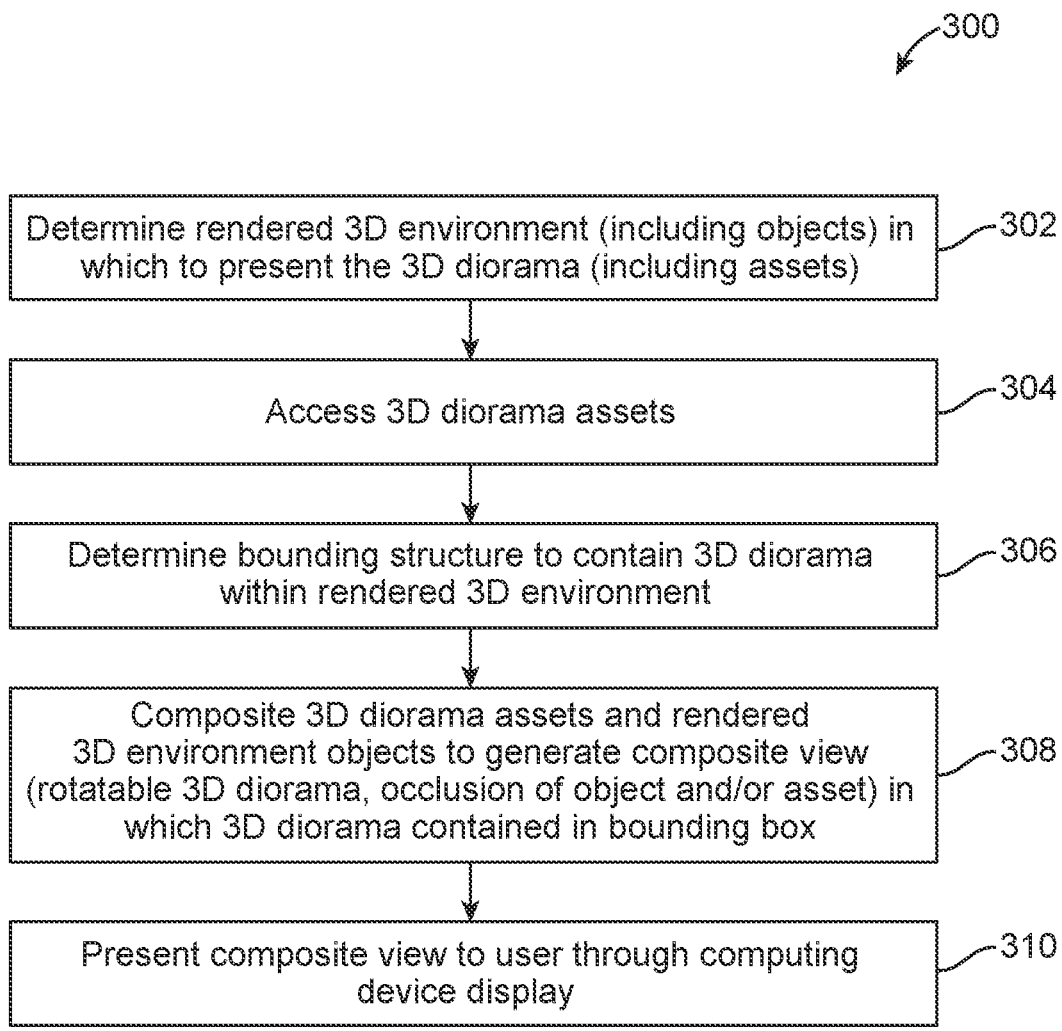
FIG. 3 is a flow diagram of one embodiment for generating a composite view of 3D diorama structures contained in a bounding box and computer-generated 3D environment objects.

Thus, referring to FIG. 3 and with continuing reference to FIG. 1, in a computer-implemented method 300 according to one embodiment, in response to user selection of an icon 122, at 302, diorama integrator 170 determines rendered 3D environment 160 (including objects 162 thereof) in which to present 3D diorama 150 associated with application 140 corresponding to a selected icon. As noted above, rendered 3D environment 160 may be based at least in part on the application 140 domain (e.g., a classroom environment for an education application). At 304, diorama integrator 170 accesses 3D diorama assets 152 associated with application 140, and at 306, determines a bounding structure 180 such as a bounding box (generally, bounding box 180) in which 3D diorama 150 is to be contained in rendered 3D environment 160. Bounding box 180 provides a virtual separation of or boundary between 3D diorama assets 152 and rendered 3D environment objects 162 such that 3D diorama assets 152 do not extend beyond bounding box 180. Bounding box 180 boundaries are defined by lines, sides or planes 182 (generally, plane), which may or may not be visible or presented to user.

At 308, 3D diorama 150 is composited or merged with rendered 3D environment 160 to generate composite view 172. Composite view 172 includes 3D diorama 150 contained within bounding box 180, which is contained within rendered 3D environment 160. Composite view 172 is then presented to user through display of 112 of computing device 110 at 310, e.g., through a portal 120 page, such as second portal page 121b.

Composite view 172 integrates 3D diorama assets 152 into rendered 3D environment 160, and can be manipulated or moved automatically according to a programmed animation or in response to user input, e.g., as received through second portal page 121b or other page of portal 120. For example, 3D diorama 150 may be rotated 153 within rendered 3D environment 160. During user controlled or automated rotation 153, the resulting scene accounts for occlusions 190 and changes thereof. For example, from the perspective of a first point of view or first rotational position of 3D diorama 150, an asset 152 of 3D diorama 150 may occlude 190 all or a portion of an object 162 of rendered 3D environment 160, whereas from the perspective of a second point of view or second rotational position of 3D diorama 150, an object 162 of rendered 3D environment 160 may occlude 190 all or a portion of an asset 152 of 3D diorama 150. Further aspects of embodiments are described in further detail with reference to FIGS. 3-5 and with reference to system components and configurations depicted in FIG. 1.

Figure 4:
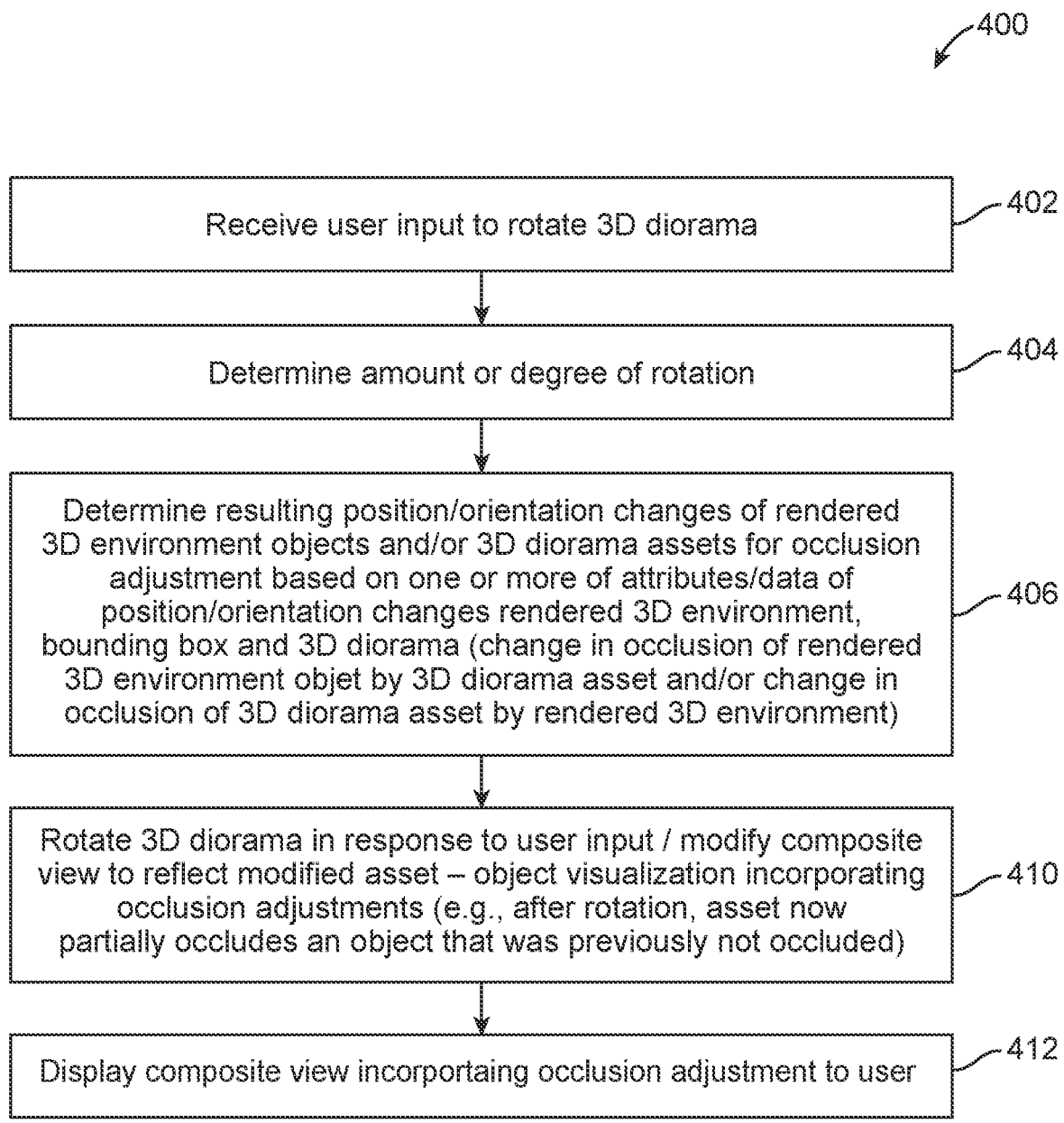
FIG. 4 is a flow diagram of one embodiment for rotation-based occlusion adjustments in a composite view of 3D diorama assets and computer-generated 3D environment objects.

Referring to FIG. 4, asset-object and object-asset occlusions 190 resulting from rotation 153 of 3D diorama 150 or positioning the resulting scene for different points of view are processed to provide verisimilitude in the rendered 3D environment 160. In this manner, as 3D diorama 150 is rotated 153 or moved, embodiments depict how or to what degree a 3D diorama asset 152 occludes 190 a rendered 3D object 162, and how or to what degree a rendered 3D environment object 162 occludes 190 a 3D diorama asset 152. For example, from one point of view at a first rotational position 153, there is no occlusion 190 of a 3D diorama asset 152 or rendered 3D environment object 162, whereas from another point of view or at a second rotational position 153, a 3D diorama asset 152 at least partially occludes 190 an object 162, and in yet another rotational position 153, an object 162 may at least partially occlude a 3D diorama asset 152. Diorama integrator 170 determines occlusion and visualization changes to adjust the resulting composite view 172 and provide an accurate depiction of how 3D diorama assets 152 and rendered 3D environment objects 162 appear relative to each other at different rotational positions 153 or points of view in composite view 172.

For these purposes, referring to FIG. 4, in a computer-implemented method 400 according to one embodiment, at 402, diorama integrator 170 receives user input to rotate 3D diorama 150 based an input or control received through a portal 120 page, or is triggered to execute rotation or programmed animation. At 404, diorama integrator 170 determines the requested or programmed degree of 3D diorama 150 movement or rotation 153 (e.g., rotate 3D diorama 30 degrees). For example, if portal 120 is a web portal, user may use their mouse, touchpad, or a controller of a VR display device to initiate rotation 153 of presentation of 3D diorama 150. 3D diorama 150 can be rotated 153 in a manner that simulates movement of a viewpoint around 3D diorama 150, as if a camera is panning around the scene of the 3D diorama 150 presented within rendered 3D environment 160.

At 406, diorama integrator 170 determines how rotation 153 impacts visualization of 3D diorama assets 152 and rendered 3D environment objects 162, e.g., if an asset 152 would be positioned in front of an object 162 to partially occlude object 162. For this purpose, diorama integrator 170 determines or receives input data or attributes of rendered 3D environment 160, objects 162 thereof, bounding box 180, 3D diorama 150 and assets 152 thereof.

Rendered 3D environment 160 and object 162 attributes or data may include one or more or all of the following: point(s) of reference in rendered 3D environment 160, rendered 3D environment 160 structure/dimensions, types of objects 162, object 162 structure/dimensions and object 160 position/orientation within rendered 3D environment 160 relative to rendered 3D environment 160 point of reference and/or other objects 162. Bounding box 180 attributes or data may include one or more or all of the following: bounding box 180 attributes data point(s) of reference of bounding box 180, bounding box 180 structure/dimensions and bounding box 180 position/orientation within rendered 3D environment 160 relative to point(s) of reference. 3D diorama 150 attributes or data may include one or more or all the following: asset 152 structure/dimensions, asset 152 position/orientation within bounding box 180 relative to bounding box 180 point of reference, and asset 152 position/orientation relative to other assets 152 in bounding box 180. Thus, diorama integrator 170 receives data different virtual structures, rotational positions/orientations relative to point (s) of reference.

Diorama integrator 170, having received point of reference, bounding box 180, asset 152 and object 162 data, determines how an initial scene view at a first rotational position changes after 3D diorama 150 is rotated 153 to a second rotational position with a different scene view, e.g., based on occlusion 190 changes. For example, rotation 153 of 3D diorama 150 may involve an asset 152 of 3D diorama 150 in a first rotational position occluding 190, or being occluded 190 by, a first portion of an object 162 of rendered 3D environment 160, and asset 152 of 3D diorama 150 in the second rotational position occluding 190, or being occluded 190 by, a second portion of object 162 different from the first portion of object 162. As another example, an asset 152 of 3D diorama 150 in the first rotational position at least partially occludes 190, or is at least partially occluded 190 by, a first object 162a ("a" indicating "first") of rendered 3D environment 160, and asset 152 of 3D diorama 150 in the second rotational position does not occlude, and is not occluded by, first object 162a. As yet another example, occlusion 190 changes involving a 3D diorama asset 152 may involve multiple objects 162, such as asset 152 of 3D diorama 150 in the second rotational position at least partially occluding 190, or being at least partially occluded 190 by, a second, different object 162b ("b" indicating "second") of rendered 3D environment 160. As a further non-limiting example, asset 152 of 3D diorama 150 in a first rotational position at least partially occludes 190, or is at least partially occluded 190 by, a single object 162 of rendered 3D environment 160, and asset 152 of 3D diorama 150 in a second rotational position at least partially occludes 190, or is at least partially occluded 190 by, multiple objects 162 of rendered 3D environment 160.

Referring again to FIG. 4, at 410, diorama integrator 170 initiates generation of a view in which 3D diorama 150 is rotated 153 in response to user input or according to a pre-determined animation sequence to generate a modified or updated composite view 172. Composite view 172 reflects modified asset 152—object 162 visualization incorporating any occlusion 190 changes due to rotation 153 or other movement. At 412, modified composite view 172 is presented to user through display 112 of computing device 110 to provide user with a preview of the application's user experience.

FIGS. 5-13 depict examples of how embodiments may be implemented. With embodiments, 3D diorama 150, such as an extended diorama or DioramaX, may be presented within any suitable application 140, portal 120, or other user experience presented to user via computing device 110. For example, 3D diorama 150 may be presented within portal 120 or app store that presents users with a collection of available applications 140 (apps) that may be purchased, downloaded, and/or presented on computing device 110 such as a head worn spatial computing device. In a particular example, 3D diorama 150 may be shown on MAGIC LEAP WORLD online retail store service featuring computer software programs, which is a multi-purpose initiative to enable end users to discover content and solutions, as well as to enable remote purchase and provisioning to computing device 110, such as spatial computing device (e.g., the ML1™ spatial computing device from Magic Leap, Inc.). MAGIC LEAP WORLD is a registered trademark of Magic Leap, Inc., Plantation, Fla. Such services may also enable application 140 developers or distributors to better market and promote their content and solutions.

Presenting 3D diorama 150 through services such those noted above from Magic Leap, Inc. or other suitable portal 120 enables individuals or entities to merchandise and showcase a content or solution catalog, to allow potential end users to learn what content is available to be downloaded to computing device 110 such as a head worn spatial computing device including upcoming content and solutions. Those end users who already have a spatial computing device can discover, purchase, and provision installation of content on their device remotely, through portal 120. Developers and publishers of content can market and promote their content through portal 120 to potential end users (e.g., customers).

Figure 6:
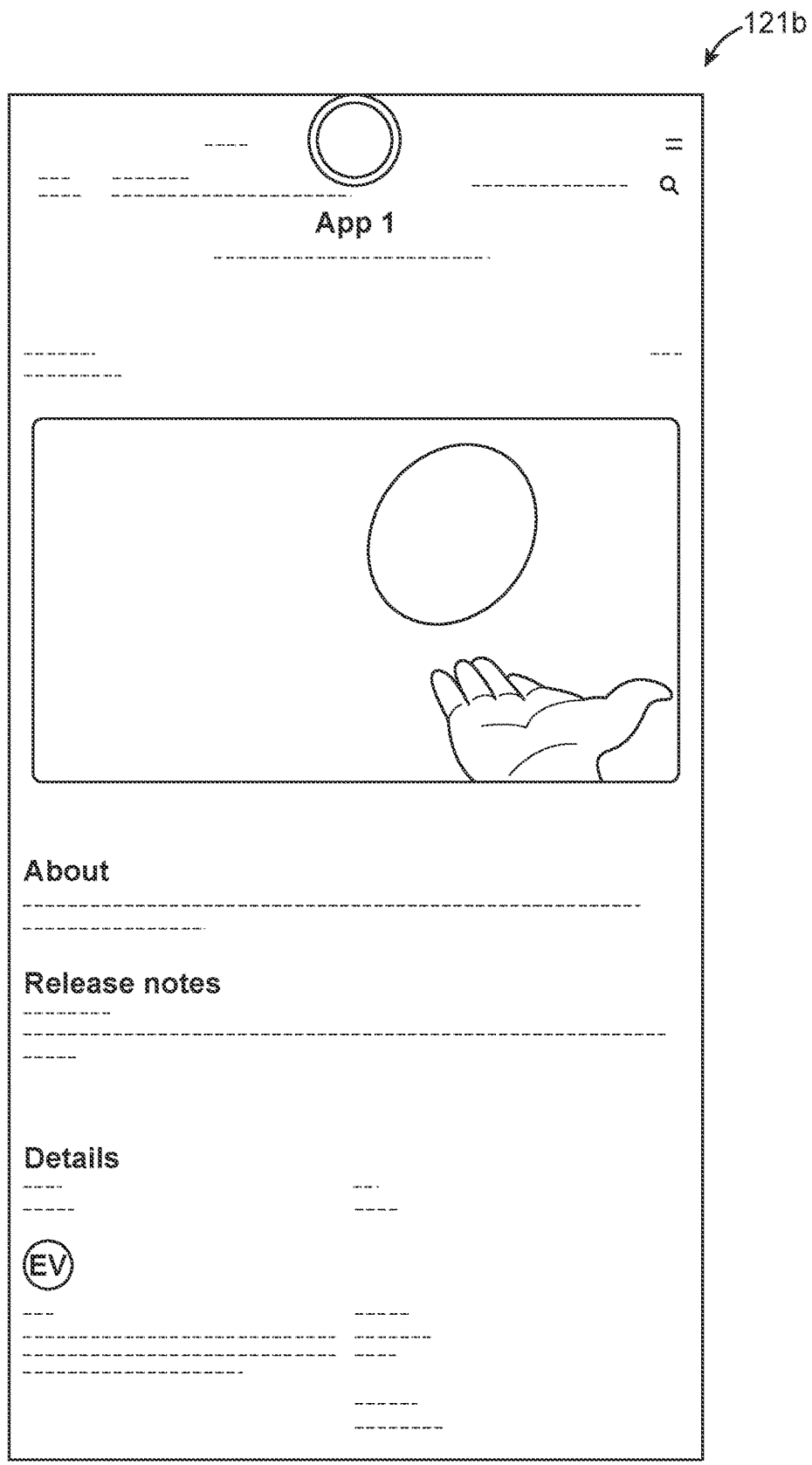
FIG. 6 depicts a second or details page of a portal that includes additional information about a spatial computing content item or application corresponding to an icon selected in the first or icon page of FIG. 5.

Referring to FIGS. 5-6, one embodiment of portal 120 is a web portal includes multiple pages 121 that can be navigated by user through web browser 116 executed by computing device 110. As noted above, in one embodiment, computing device 110 is a spatial computing device that includes or can access portal 120, e.g., in the form of icons of "windows" or "picture frames" into which a user can look. FIGS. 5-6 depict an embodiment of portal 120 including a first or icon portal page 121a and a second or detail portal page 122b. As shown in the illustrated example, portal 120 presents icons 122, cards or other graphical elements (generally, icons 122) indicating spatial computing content items or applications 140 that are available for purchase and/or download. Portal 120 may indicate available content using any suitable arrangement of application icons 122. Portal 120 may be available online to users who can access portal 120 through a suitable computing device 110, including but not limited to a desktop computer, portable computing device (e.g., smartphone, wearable computer, etc.), spatial computing device such as a head worn spatial computing device, and so forth.

One or more or all applications 140 may have a 3D diorama 150 associated with it, and presentation of 3D diorama 150 can provide the potential user with a preview or sense of the spatial computing experience that application 140 provides when executed on computing device 110 such as spatial computing device.

Referring to FIG. 5, and with reference to FIG. 6, first or icon portal page 121a includes a plurality of icons 122a-p (generally, icon 122) identifying respective applications 140a-p (generally, application 140), e.g., by name. Referring to FIG. 6, when a user selects or clicks on one of these icons 122, a second or detail page 121b is presented to user with additional information about application 140 and one or more UI elements, buttons or controls that can be selected by user to download application 140 to user's computing device 140 and to manipulate a display within second portal page 121b. For example, second or detail page 121b may identify application 140 by name and include information about application 140, release notes and other application 140 details.

Figure 7:
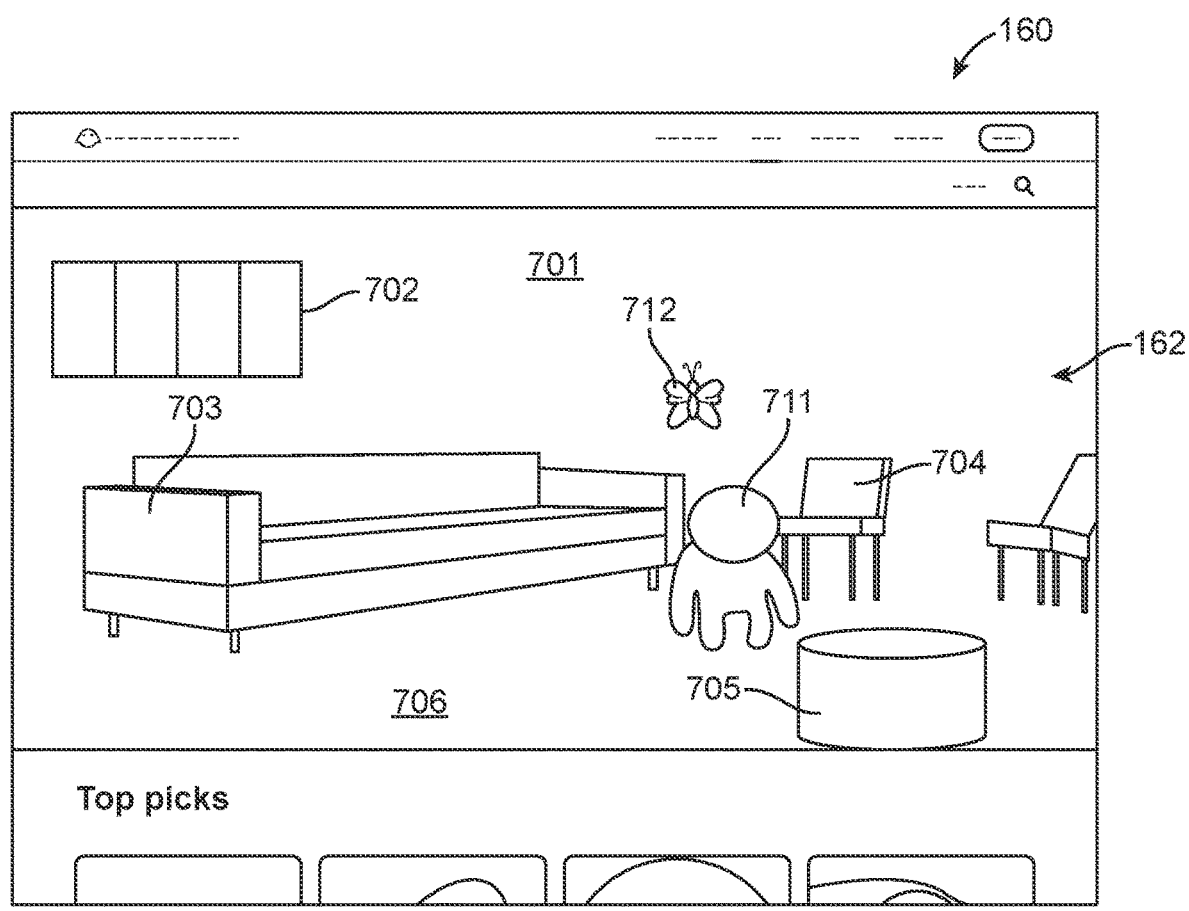
FIG. 7 depicts an example of an expanded icon through or by which a composite view including a computer-generated 3D environment of a room and 3D diorama assets including an astronaut and a butterfly can be observed.

FIG. 7 depicts an example of a rendered 3D environment 160 or "room" in the form of a rendered living room including objects 162 of walls 701, windows 702, sofa 703, chairs 704, footrest 705 and floor 706. In some embodiments, rendered 3D environment 160 includes a virtual scene and objects that simulate a real-world environment. In some embodiments, rendered 3D environment 160 is based on real-world images of the user's environment. The environment can be any suitable environment, including indoor and outdoor spaces. In this way, the 3D diorama 150 may include assets 152 that are anchored in a "physical" space.

FIG. 7 depicts an example of 3D diorama 150 within rendered 3D environment 160. In the illustrated example, 3D diorama 150 includes an astronaut asset 711 and butterfly asset 712 contained in bounding box 180 (not visible to user in this example). Butterfly asset 712 may fly around in proximity to astronaut asset 711 while the head or body of astronaut asset 711 follows butterfly asset 712. In this way, 3D diorama assets 152 may react to each other in the animation of 3D diorama 150.

3D diorama 150 may be contained within a bounding box 180 (not visible in FIG. 7), and the virtual bottom of bounding box 180 may be depicted as being placed on a horizontal surface of rendered 3D environment 150, such as floor object 706 or a tabletop object. In this manner, 3D diorama 150 includes assets 152 that are depicted as being anchored in a "physical" space. For example, in FIG. 7, the bottom of the bounding box 180 is depicted as being placed on floor object 706 of rendered living room environment. A side of bounding box 180 may also be placed up against a vertical surface (e.g., wall) of an object 162 of rendered 3D environment 160.

In the example depicted in FIG. 7, 3D diorama 150 for application 140 called "Create" is depicted and is shown as an expanded icon 122 for the application 140 in first or icon portal page 121*a* relative to other unexpanded icons partially depicted in bottom portion of FIG. 7 and below expanded "Create" icon 122. 3D diorama 150 can quickly and effectively convey to a user the spatial experience that application 140 would provide when application 140 is presented and/or executed by computing device 110. 3D diorama 150 can be designed to provide fast load times in portal 120, to avoid long latency while the user waits for 3D diorama 150 to begin presentation.

3D diorama 150 can be shown in browse and/or detail pages of portal 120, and assets 152 included in 3D diorama 150 may occlude 190 objects presented in the rendered 3D environment 160, as the assets 152 move in their animation and/or as the scene is rotated 153. For example, if astronaut asset 711 of FIG. 7 moves in its animation to be in front of sofa object 703 of rendered living room, astronaut asset 711 may occlude 190 the view of at least a portion of sofa object 703. Further, if during rotation 153 of scene astronaut asset 711 passes between the user's viewpoint and sofa object 703, then astronaut asset 711 can occlude 190 at least a portion of sofa object 703. Similarly, objects 162 of rendered 3D environment 160 can at least partly occlude 190 assets 152 of 3D diorama 150, for example, if an object 162 of rendered 3D environment 160 is between the viewer and asset 152. Objects 162 can move into and out of occlusion 190 as the scene is rotated 153 and/or as 3D diorama assets 152 are animated, to provide verisimilitude in the rendered spatial 3D environment 160. Such occlusion 190 can provide a suitable preview of the spatial computing experience that the user may enjoy if they download application 140 to their computing device, such as spatial computing device, given that the interaction of virtual and real-world objects may be an aspect of the spatial experience. In this manner, 3D diorama 150 can quickly and effectively convey the spatial experience that would be provided by application 140, and entice users to download application 140 and have that spatial experience for themselves.

Figure 8:
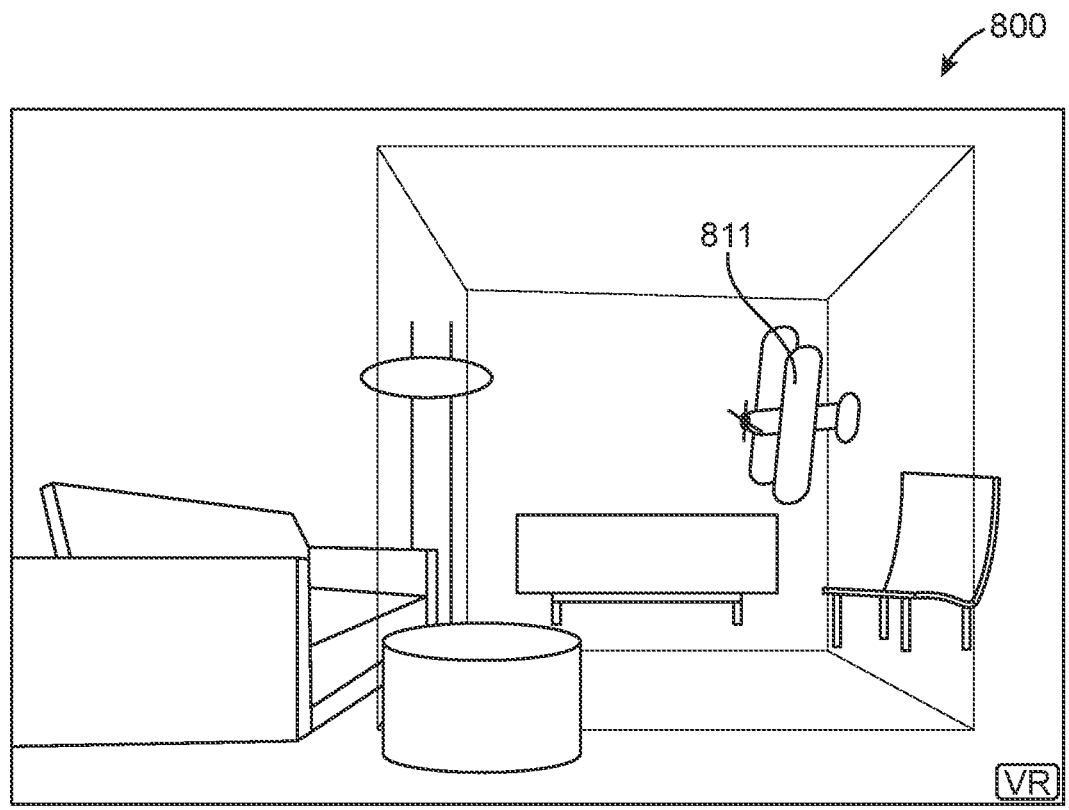
FIG. 8 depicts an example of a composite view in which 3D diorama asset of an airplane does not include a computer-generated 3D environment object of a sofa when viewed from a first rotational position.
Figure 9:
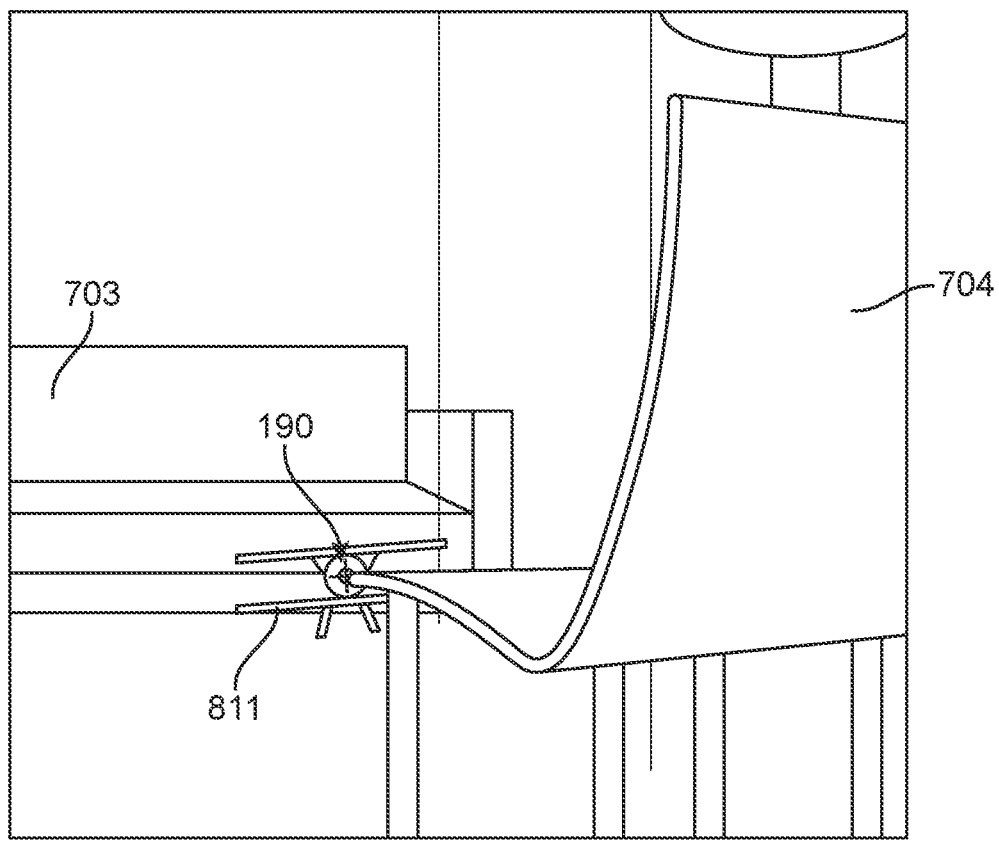
FIG. 9 depicts an example of a composite view in which the 3D diorama asset of an airplane of FIG. 8 at least partially occludes a computer-generated 3D environment object of a sofa when viewed from a second rotational position different from the first rotational position.

FIGS. 8 and 9 depict another example involving a rendered 3D environment 160 in the form of an augmented 3D environment 800 including wall object 801, sofa object 803, chair object 804, footrest object 805, floor object 806 and lamp object 807. In the illustrated example, 3D diorama 150 includes an aircraft asset 811. Animation for this composite view 172 may include aircraft asset 172 flying around augmented 3D environment 800 and may be used to depict a spatial experience provided by a flight simulation application 140. In FIG. 9, aircraft asset 811 is partially occluded 190 by chair object 804 of augmented 3D environment 800 as aircraft asset 811 flies behind chair object 804 and/or as the scene is rotated 153 such that aircraft asset 811 is positioned behind chair object 804.

Figure 10:
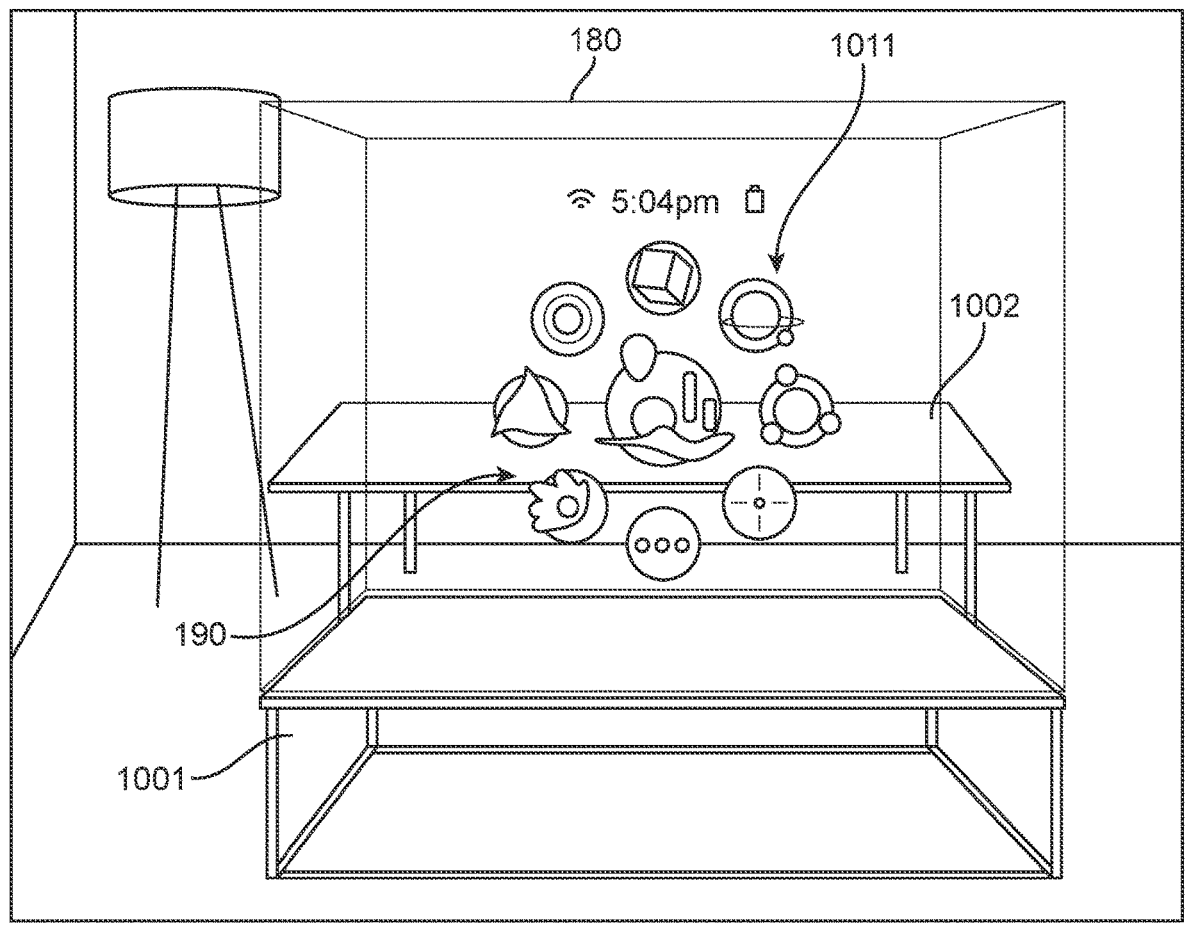
FIG. 10 depicts an example of a composite view in which the 3D diorama asset of a menu for an AR/VR system, contained within a bounding box depicted as being placed on a computer-generated 3D environment object of a coffee table, is at least partially occludes an object of a computer-generated 3D environment shown in the background relative to the menu asset.
Figure 11:
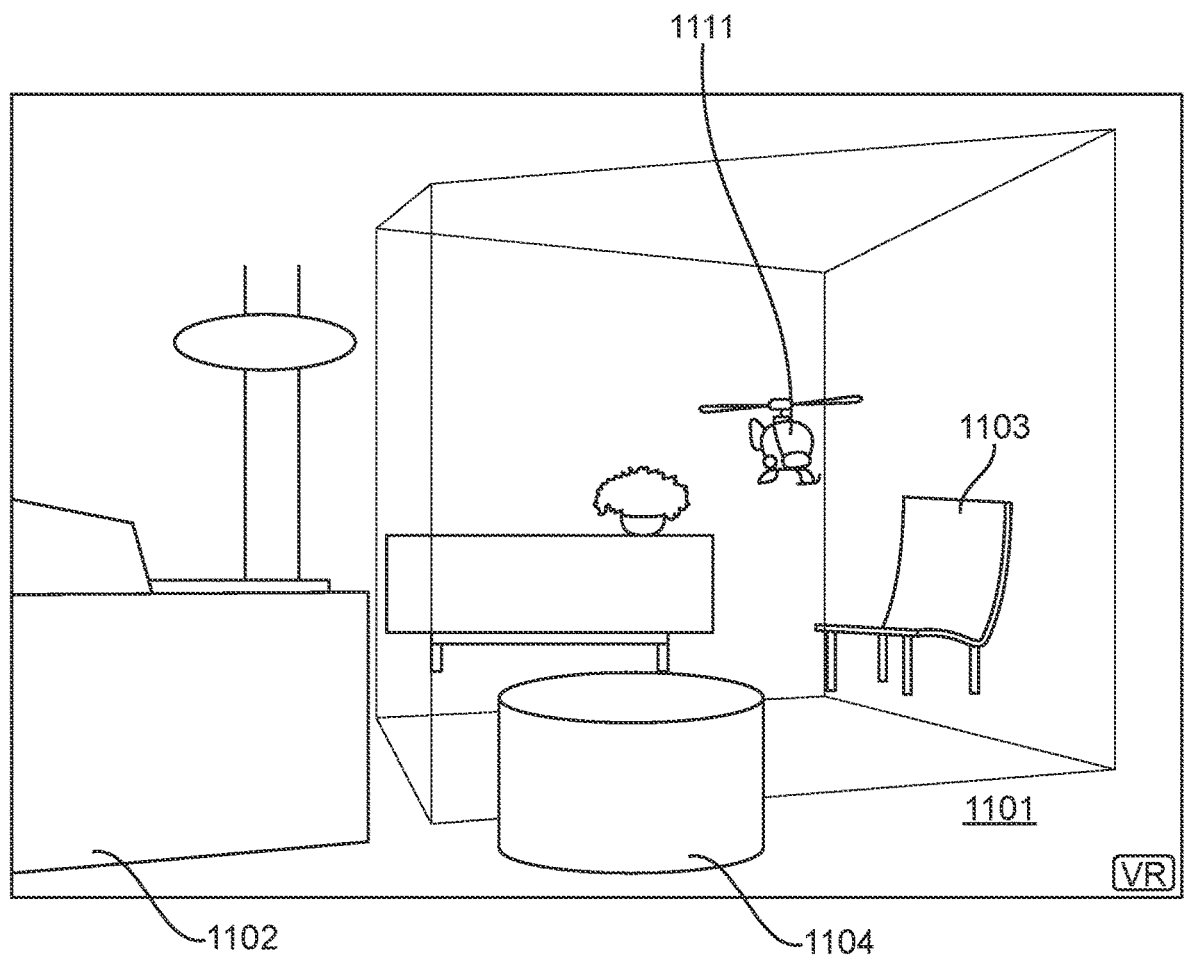
FIG. 11 depicts an example of a composite view in which the 3D diorama asset including a helicopter is contained within a bounding box depicted as being placed an a computer-generated 3D environment object of a floor of a room, and in which the helicopter asset, from the depicted rotational position, does not occlude any furniture objects of the computer-generated 3D environment.

FIGS. 10 and 11 depict additional examples of composite views 172 including 3D dioramas 150 and a bounding box 180. FIG. 10 depicts a 3D diorama 150 including a menu asset 1011 for navigation, download or selection of different applications 140, and FIG. 11 depicts a 3D diorama 150 including a helicopter asset 1111. FIGS. 10 and 11 further show how a bounding box 180 may be positioned within various rendered 3D environments. Bounding box 180 has a virtual bottom or bottom plane 182 that is shown as resting on a top or horizontal surface, e.g., on top of coffee table object 1001 as shown in FIG. 10, or on floor object 1101 of FIG. 11. FIG. 10 further illustrates an example in which menu asset 1011 occludes 190 a portion of table object 1002 positioned in the back of the room, and with a rotation 153 of 90 degrees, the table object would no longer be occluded. Similarly, in FIG. 11, with the current rotational position, helicopter asset 1111 does not occlude any object, but with an animation of helicopter asset 1111 flying to a lower level and rotation 153 of 90 degrees, helicopter asset 1111 may then at least partially occlude sofa object 1102. Accordingly, it will be understood that 3D diorama assets 152 may or may not occlude an object 162, and that occlusion 190 may change based on rotation 153 changes and/or animation sequence that reposition 3D diorama assets 152 relative to rendered 3D environment objects 162.

Figure 12A:
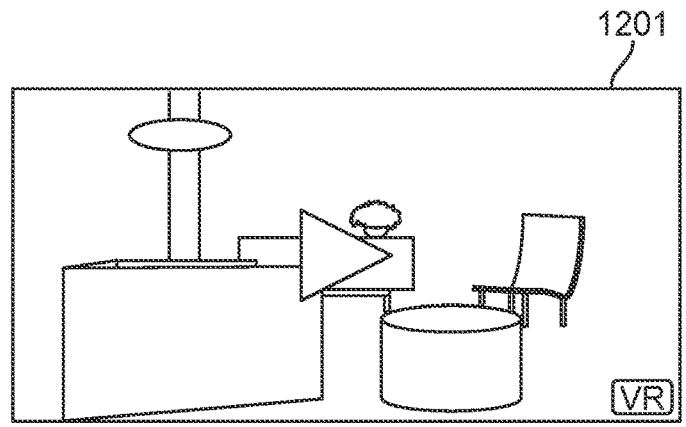
FIGS. 12A-D depict one embodiment of a composition method for generating a composite view of a 3D diorama and a computer-generated 3D environment based on asset and object examples shown in FIG. 11.
Figure 12B:
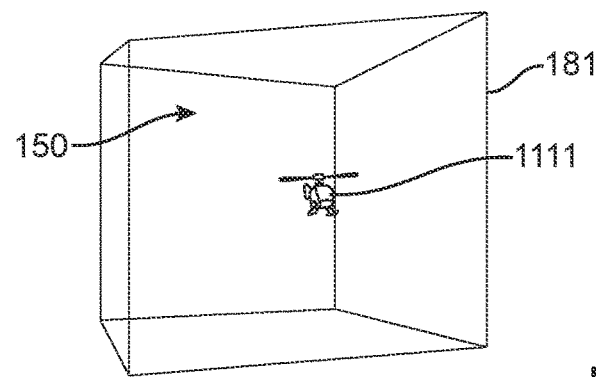

FIGS. 12A-D depict an example composition of a 3D diorama 150 and a rendered 3D environment 160 based on objects 162 and assets 152 depicted in FIG. 11. 3D diorama 150 can be provided by the publisher of spatial computing content item or application 140, the application 140 developer, or other entity. 3D diorama can be in any suitable format, such as gITF. 3D diorama 150 can be created to contain any suitable number of assets 152, such as 3D models, animations, and so forth. 3D diorama assets 152 can be arranged to fit inside a bounding box 180 volume as shown in FIG. 12B. Bounding box 180 can include any suitable assets 152 that demonstrate the spatial computing experience provided by application 140.

Rendered 3D environment 160 (e.g., a room) can be selected or otherwise determined, e.g., based on a domain. Rendered 3D environment 160 can be rendered as a video 1201 (as depicted in FIG. 12A) of a camera panning around a central focus or reference point on a horizontal axis, such that the viewpoint of the user appears to be rotating around the scene in helicopter asset 1111 that is horizontal. As the user clicks and drags on the image, video 1201 can be scrubbed as the camera moves to keep it in line. In some examples, the rendered 3D environment 160 is an MP4 format video.

Figure 12C:
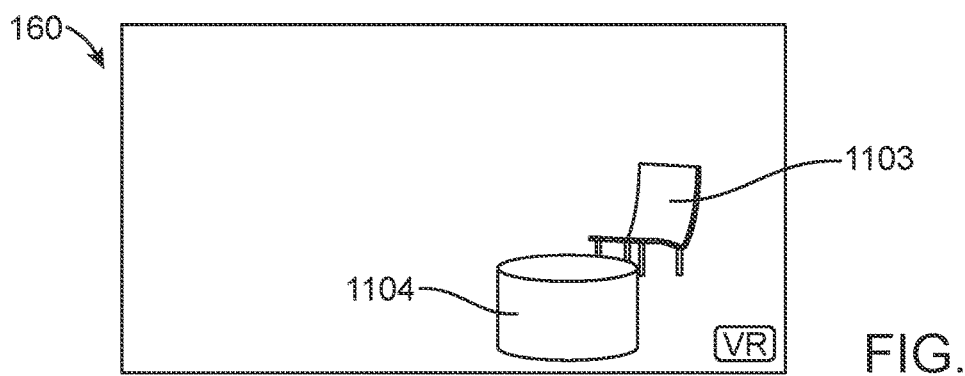

Rendered 3D environment 160 can include any suitable number and type of objects 162 that can be occluded, such as chair object 1103 and footstool object 1104 shown in FIG. 12C. Such objects can occlude, or be occluded by, the 3D diorama assets 152, and the state of occlusion 190 (whether or not occluded, partial or complete occlusion) can vary based on one or more or all of rotation 153, whether horizontal and/or vertical (e.g., to provide 360 degrees of different scene views—from left to right, front to back, top to bottom, and combinations thereof) and 3D diorama 150 animation, resulting in repositioning of 3D diorama assets 152. The geometry of the rendered 3D environment 160, rendered as a video 1202, can be exported as a 3D mesh in a suitable format (e.g., gITF). This mesh can then be layered on top of the diorama assets to support occlusion 190.

Figure 12D:
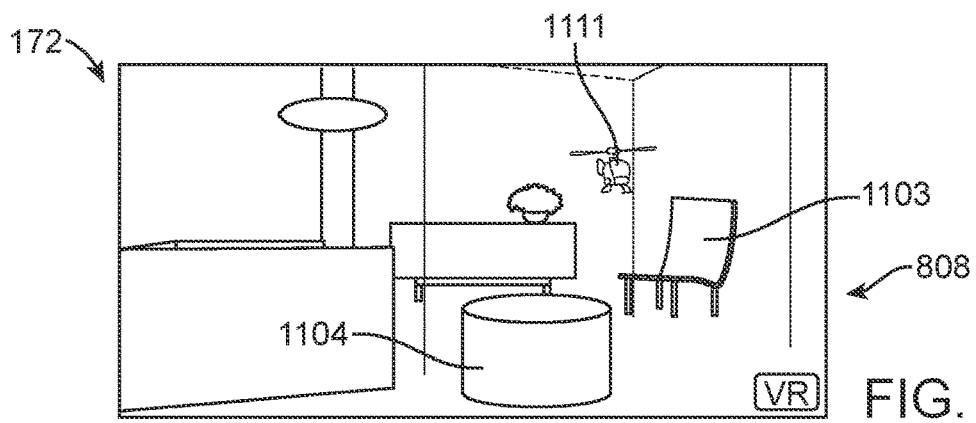

Referring to FIG. 12D, the resulting composite view 172 of rendered 3D environment 160 and diorama 150 may be generated by compositing based on the mesh of the rendered 3D environment 160. Composite view 172 provides a 3D rendered environment diorama that showcases how an experience may be provided through a spatial computing system within the context of a physical room or other real-world environment.

Figure 13:
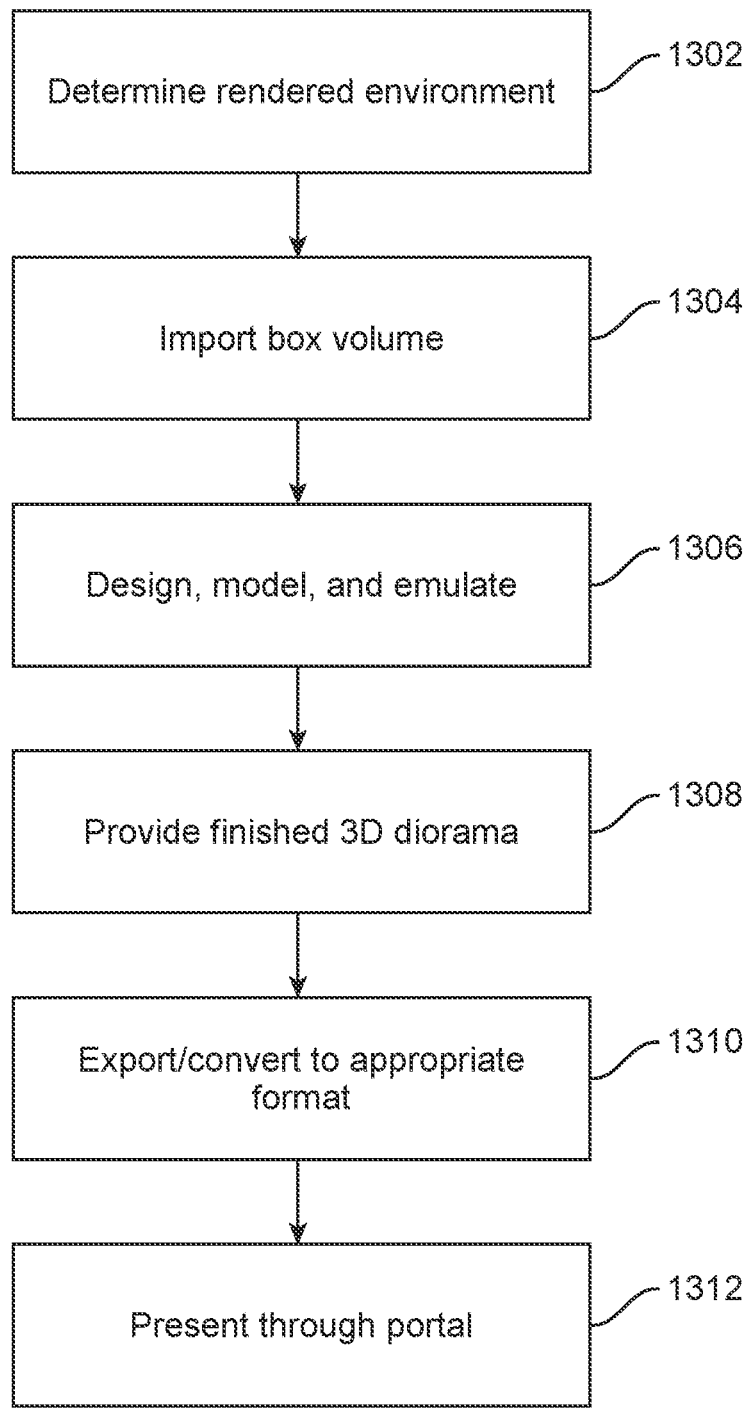
FIG. 13 is a flow diagram of one embodiment of a process for providing a 3D diorama.

With reference to FIG. 13 and with continuing reference to the illustrative embodiments discussed above including embodiment examples of FIGS. 5-12D, one embodiment of a computer-implemented method 1300 comprises, at 1302, determining a rendered 3D environment 160. In some embodiments, rendered 3D environment 160 may be designated to be used with a certain 3D dioramas 150. This selection can impact the size of bounding box 180 volume that will be used to contain 3D diorama 150. In some embodiments, rendered 3D environment 160 can be determined based at least partly on a domain of application 140. For example, a rendered 3D environment 160 of a classroom setting may be used for an education application 140. At 1304, bounding box 180 is imported into a suitable graphics program (e.g., MAYA graphics program available from Autodesk, San Rafael, Calif., as a starting point. MAYA is a registered trademark of Autodesk, Inc., San Rafael, Calif. This may ensure that 3D diorama 150 is created at the correct scale according to determined bounding box 180 volume. Bounding box 180 volume may be a real world scale. At 1306, 3D diorama 150 is designed, modeled, emulated or otherwise created within the graphics program. This can ensure that assets 152 of 3D diorama 150 fit within bounding box 180, and that 3D diorama 150 adheres to other specifications. At 1308, the completed 3D diorama 150 is provided, e.g., as an ASCII file or in some other suitable format for a graphics program such as MAYA graphics program, and, at 1310, 3D diorama 150 is exported to and/or converted into to an appropriate format for presentation. This may involve compositing 3D diorama 150 with the indicated rendered 3D environment 160 as described herein. At 1312, 3D diorama 150 is then made available to be presented through portal 120 for display to user of computing device 110.

In some embodiments, compositing of rendered 3D environment 160 with 3D diorama 150 can include rendering the video texture (such as of a room) to a billboarded card facing a camera. 3D diorama 150 can be rendered using a suitable format (e.g., gITF) in front of the billboard. Then, the occludable geometry objects from the room can be rendered with a depth-only shader to occlude the assets of the 3D diorama. The 3D viewpoint's camera can then be synchronized with the same camera movement and intrinsics that are used to render the video texture.

In some embodiments, the maximum file size of 3D diorama 150 (e.g., in gITF) is 3 MB. This may include all textures, models and animations in a single file. The process may utilize Draco mesh compression (open source library), DDS for texture compression, and/or other suitable compression techniques. Using joints and skins can cause performance issues, so use of those may be limited those to some degree. The use of assets 152 may be limited to utilize unlit shaders. These can be a color and/or a texture. The use of different materials may be constrained such that the material count low if possible. Different lighting may be incorporated into the textures.

In some embodiments, the animation of 3D diorama 150 may have a time duration (e.g., 1 second), and may repeat any suitable number of iterations (or indefinitely). The animation may have any suitable frame rate (e.g., 60 fps). Assets 152 of 3D diorama 150 may exist in bounding box 180 and may not be rendered in a way that is cognizant of the non-occludable objects 162 in rendered 3D environment 160 or other content around bounding box 180. In some embodiments, 3D diorama 150 can be created such that assets 152 can interact with a surface on which bounding box 180 is shown as resting (e.g., floor, table top objects) or otherwise adjacent to, but not other surfaces in objects 162 of rendered 3D environment. For example, aircraft asset 811 shown in FIGS. 8-9 may land on a floor object (e.g., the bottom of bounding box 180) but not on a sofa object.

Figure 14:
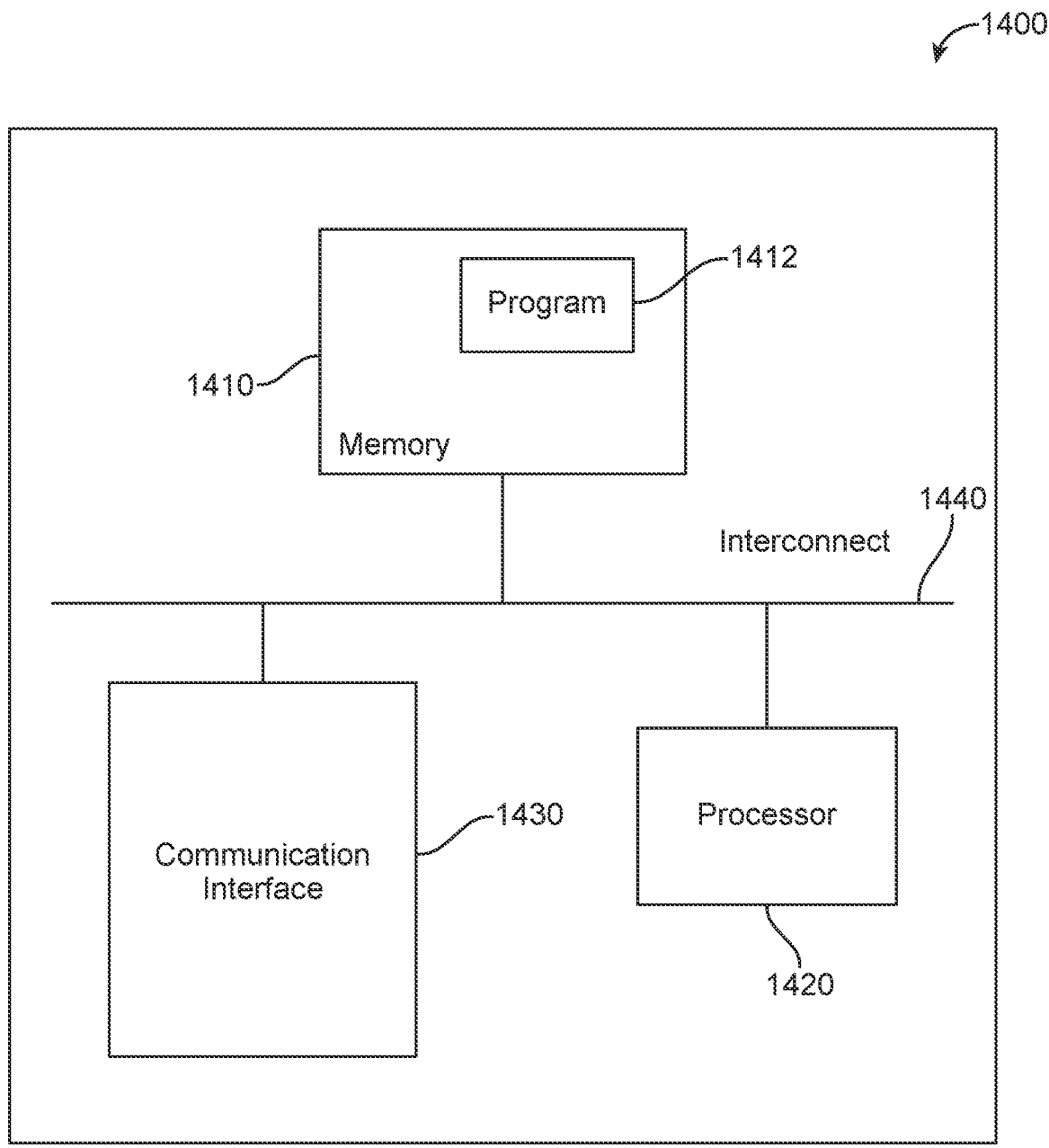
FIG. 14 is a block diagram of components of a computing system that may be utilized in embodiments.

FIG. 14 generally illustrates certain components of a computing device 1400 that may be utilized to execute or that may embody components of embodiments. For example, the computing device may include a memory 1410, program instructions 1412, a processor or controller 1420 to execute instructions 1412, a network or communications interface 1430, e.g., for communications with a network or interconnect 1440 between such components. The memory 1410 may be or include one or more of cache, RAM, ROM, SRAM, DRAM, RDRAM, EEPROM and other types of volatile or non-volatile memory capable of storing data. The processor unit 1420 may be or include multiple processors, a single threaded processor, a multi-threaded processor, a multi-core processor, or other type of processor capable of processing data. Processor 1420 performs steps or executes program instructions 1412 within memory 1410 and/or embodied on the carrier to implement method embodiments.

Depending on the particular system component (e.g., whether the component is a computer, a hand held mobile communications device, or devices with embedded computing capabilities, such as Internet of Thing devices), the interconnect 1440 may include a system bus, LDT, PCI, ISA, or other types of buses, and the communications or network interface may, for example, be an Ethernet interface, a Frame Relay interface, or other interface. The network interface 1430 may be configured to enable a system component to communicate with other system components across a network which may be a wired or wireless or with various other networks. It should be noted that one or more components of computing device 1400 may be located remotely and accessed via a network. Accordingly, the system configuration provided in FIG. 14 is provided to generally illustrate how embodiments may be configured and implemented.

Method embodiments or certain steps thereof, some of which may be loaded on certain system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, holographic devices; magneto-optical media; and hardware devices that are specially configured to store and execute program code, such as programmable microcontrollers, application-specific integrated circuits ("ASICs"), programmable logic devices ("PLDs") and ROM and RAM memory devices, and other carriers now known or later developed capable of storing data.

Embodiments may be implemented utilizing computer code may include machine code, such as produced by a compiler or other machine code generation mechanisms, scripting programs, and/or other code or files containing higher-level code that are executed by a computer using an interpreter or other code execution mechanism. For example, some embodiments may be implemented using assembly language, Java, C, C#, C++, scripting languages, and/or other programming languages and software development tools as are known or developed in the art. Other embodiments may be implemented in hardwired circuitry in place of, or in combination with, machine-executable software instructions.

While this specification contains many specific details, these details should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Method steps described herein can be performed serially or in parallel. In some instances, certain steps may be omitted, modified, or added to a described method, without departing from the spirit and scope of the disclosure.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claim.

For example, while certain embodiments are described with reference to computer-implemented methods performed by an online portal or diorama integrator, it will be understood that process operations may be performed by any suitable number and type of computing device(s). Further, while particular embodiments are described with reference to a computing device of a head worn spatial computing device, such as a VR or AR display device, embodiment are not so limited, and the computing device may include a portal, or access a portal. Further, while certain embodiments are described with reference to computer-implemented methods performed by an online portal or diorama integrator, it will be understood that process operations may be performed by any suitable number and type of computing device(s). Additionally, while certain embodiments are described with reference to a particular 3D diorama being associated with a particular application, embodiments may involve a particular 3D diorama being associated with multiple different applications. As another example, while certain embodiments are described with reference to a 3D diorama at least partially occluding a rendered 3D environment object or a rendered 3D environment object at least partially occluding a 3D diorama asset, embodiments may involve occlusion of multiple objects by one or more assets, occlusion of multiple assets by one or more objects, one or more objects that occlude one or more other objects, and one or more assets that occlude one or more other assets. Further, the degree of occlusion may be partial or complete occlusion, and occlusion may change based on different points of view or rotational positions. Thus, one object may not be occluded but is partially or completely occluded when viewed with 3D diorama at a different rotational position.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated.

What is claimed is:

1. A computer-implemented method for presenting a three-dimensional (3D) diorama in a computer-generated environment that is presented to a user of a computing device, the method comprising:
   determining a rendered 3D environment in which to present the 3D diorama, wherein the rendered 3D environment includes at least one object and the 3D diorama is associated with a spatial computing content item executable by the computing device, the 3D diorama contained within a 3D structure defining a bounding volume which provides a virtual boundary between assets of the 3D diorama and the at least one object of the 3D environment;
   accessing assets of the 3D diorama;
   compositing the assets of the 3D diorama with the rendered 3D environment to generate a composite view;
   presenting the composite view to the user through a display of the computing device, wherein the composite view is presented through a portal that is accessible or executed by the computing device;
   rotating a viewpoint of the composite view as if a camera viewpoint is panning around the composite view from a first rotational viewpoint to a second rotational viewpoint different from the first rotational viewpoint;
   as the viewpoint of the composite view is rotating from the first rotational viewpoint to the second rotational viewpoint view in a panning mode, an asset of the 3D diorama increasingly or decreasingly occludes, or is increasingly or decreasingly occluded by, the object of the rendered 3D environment; and
   wherein the asset of the 3D diorama comprises a menu asset in the form of a selectable icon for at least one of navigation, download, and selection of different application.

2. The computer-implemented method of claim 1, wherein the first asset of the 3D diorama in the first rotational position occludes, or is occluded by, a first portion of the object of the rendered 3D environment, and the asset of the 3D diorama in the second rotational position occludes, or is occluded by, a second portion of the object different from the first portion of the object.

3. The computer-implemented method of claim 1, wherein the asset of the 3D diorama in the first rotational position at least partially occludes, or is at least partially occluded by, the object of the rendered 3D environment, and the asset of the 3D diorama in a second rotational position does not occlude, and is not occluded by, the object.

4. The computer-implemented method of claim 3, wherein the asset of the 3D diorama in the second rotational position at least partially occludes, or is at least partially occluded by, a second object of the rendered 3D environment.

5. The computer-implemented method of claim 1, wherein the asset of the 3D diorama in the first rotational position at least partially occludes, or is at least partially occluded by, a single object of the rendered 3D environment, and the asset of the 3D diorama in a second rotational position at least partially occludes, or is at least partially occluded by, multiple objects of the rendered 3D environment.

6. The computer-implemented method of claim 1, wherein rotation of the viewpoint is controllable by the user.

7. The computer-implemented method of claim 6, further comprising receiving user input through the computing device, wherein the viewpoint is rotated in response to user input.

8. The computer-implemented method of claim 7, wherein the user input is generated by a mouse, a keyboard, a touchpad, or a touchscreen of the computing device.

9. The computer-implemented method of claim 8, wherein the computing device is a smartphone, a touchscreen laptop computer, a wearable computer or a spatial computing device.

10. The computer-implemented method of claim 1, wherein the viewpoint is automatically rotated according to a pre-determined animation sequence.

11. The computer-implemented method of claim 1, wherein asset of the 3D diorama moves into and out of occlusion as the viewpoint is rotated to provide verisimilitude in the rendered 3D environment.

12. The computer-implemented method of claim 1, wherein the 3D diorama depicts or provides a preview of a spatial computing user experience generated by the spatial computing content item.

13. The computer-implemented method of claim 1, wherein the rendered 3D environment is an augmented reality environment, a virtual reality environment, or a mixed reality environment.

14. The computer-implemented method of claim 1, wherein the portal is an on-line portal presented through a web browser executed by the computing device.

15. The computer-implemented method of claim 1, wherein the portal comprises a first portal page comprising a plurality of computer-generated icons identifying respective spatial computing content items, respective 3D dioramas are associated with respective spatial computing content items, and respective 3D dioramas provide respective previews of respective spatial computing user experiences generated by respective spatial computing content items.

16. The computer-implemented method of claim 15, the plurality of spatial computing content items comprising a plurality applications executable by the computing device.

17. The computer-implemented method of claim 16, further comprising:
receiving user input through an input device of the computing device comprising user selection of a computer-generated icon associated with an application; and
presenting, through a display of the computing device, a second portal page associated with the selected computer-generated icon and including information about the application.

18. The computer-implemented method of claim 17, wherein the 3D diorama is displayed within or accessible through the second portal page.

19. The computer-implemented method of claim 17, wherein the application is downloadable to the computing device through the second portal page.

20. The computer-implemented method of claim 1, wherein the assets of the 3D diorama are anchored in a virtual physical space of the rendered 3D environment.

21. The computer-implemented method of claim 1, wherein the 3D structure is a 3D bounding box comprising three pairs of opposing planes that collectively define the 3D bounding volume.

22. The computer-implemented method of claim 21, wherein at least one plane of the 3D bounding box is adjacent to a surface of an object of the rendered 3D environment.

23. The computer-implemented method of claim 22, wherein the at least one plane of the 3D bounding box comprises a virtual bottom of the 3D bounding box depicted as being placed on a horizontal surface of the object of the rendered 3D environment so that the virtual bottom of the 3D bounding box appears to rest on the horizontal surface of the object.

24. The computer-implemented method of claim 22, wherein the at least one plane of the 3D bounding box comprises a side of the 3D bounding box is placed against a vertical surface of the object of the rendered 3D environment.

25. The computer implemented method of claim 1, wherein the assets of the 3D diorama are independently controllable relative to objects of the rendered 3D environment.

26. The computer implemented method of claim 1, wherein at least one asset of the 3D diorama is an animated asset.

27. The computer-implemented method of claim 1, the 3D diorama further comprising audio content.

28. The computer-implemented method of claim 1, wherein a first asset of the 3D diorama and a second asset of the 3D diorama interact with or react to each other.

* * * * *